(12) United States Patent
Ichihashi et al.

(10) Patent No.: US 8,715,792 B2
(45) Date of Patent: May 6, 2014

(54) LIQUID-CRYSTAL DISPLAY DEVICE AND LIQUID-CRYSTAL CELL

(75) Inventors: Mitsuyoshi Ichihashi, Ashigarakami-gun (JP); Yukito Saitoh, Ashigarakami-gun (JP)

(73) Assignee: Fujifilm Corporation, Tokyo (JP)

(*) Notice: Subject to any disclaimer, the term of this patent is extended or adjusted under 35 U.S.C. 154(b) by 249 days.

(21) Appl. No.: 13/138,908

(22) PCT Filed: Apr. 23, 2010

(86) PCT No.: PCT/JP2010/057207
§ 371 (c)(1),
(2), (4) Date: Oct. 21, 2011

(87) PCT Pub. No.: WO2010/123090
PCT Pub. Date: Oct. 28, 2010

(65) Prior Publication Data
US 2012/0038858 A1 Feb. 16, 2012

(30) Foreign Application Priority Data
Apr. 24, 2009 (JP) .................. 2009-105915

(51) Int. Cl.
*G02F 1/1335* (2006.01)

(52) U.S. Cl.
USPC ............. 428/1.31; 349/97; 349/106

(58) Field of Classification Search
USPC ............ 428/1.31; 349/117–118, 96–97
See application file for complete search history.

(56) References Cited

U.S. PATENT DOCUMENTS

2002/0163616 A1 11/2002 Jones et al.
2007/0285603 A1 12/2007 Nakayama et al.
2009/0167995 A1* 7/2009 Hekstra et al. ............... 349/96

FOREIGN PATENT DOCUMENTS

| CN | 101201494 A | 6/2008 |
|---|---|---|
| CN | 101226254 A | 7/2008 |
| GB | 2 315 903 A | 2/1998 |
| JP | 05-313158 | 11/1993 |
| JP | 10-161105 | 6/1998 |
| JP | 2002-107719 A | 4/2002 |

(Continued)

OTHER PUBLICATIONS

First Office Action issued by SIPO on Dec. 4, 2013 in connection with corresponding Chinese Patent Application No. 201080027553.6.

*Primary Examiner* — Sophie Hon
(74) *Attorney, Agent, or Firm* — Jean C. Edwards; Edwards Neils PLLC

(57) ABSTRACT

A liquid-crystal display device comprising first and second polarizing elements, and a liquid-crystal cell disposed between the first and second polarizing elements, wherein the liquid-crystal cell comprises first and second substrates (provided that the first substrate is disposed closer to the first polarizing element, and the second substrate is disposed closer to the second polarizing element), a liquid-crystal layer disposed between the first and second substrates, a color filter layer disposed on an inner surface of the first substrate, and an in-cell polarizing layer disposed between the color filter layer and the liquid-crystal layer, the absorption axis of the first polarizing element and the absorption axis of the in-cell polarizing layer are parallel to each other, and the sum total of the absolute values of Re of all the layers disposed between the in-cell polarizing layer and the first polarizing element is equal to or less than 10 nm, and the sum total of the absolute values of Rth thereof is equal to or less than 15 nm.

12 Claims, 1 Drawing Sheet

(56) References Cited

FOREIGN PATENT DOCUMENTS

| | | |
|---|---|---|
| JP | 2006-071965 | 3/2006 |
| JP | 2006-071966 | 3/2006 |
| JP | 4055861 | 12/2007 |
| JP | 2008-003126 | 1/2008 |
| JP | 2008-056898 A | 3/2008 |
| JP | 2008-090317 A | 4/2008 |
| JP | 2008-242041 | 10/2008 |
| WO | WO 2007/122853 A1 | 11/2007 |

* cited by examiner

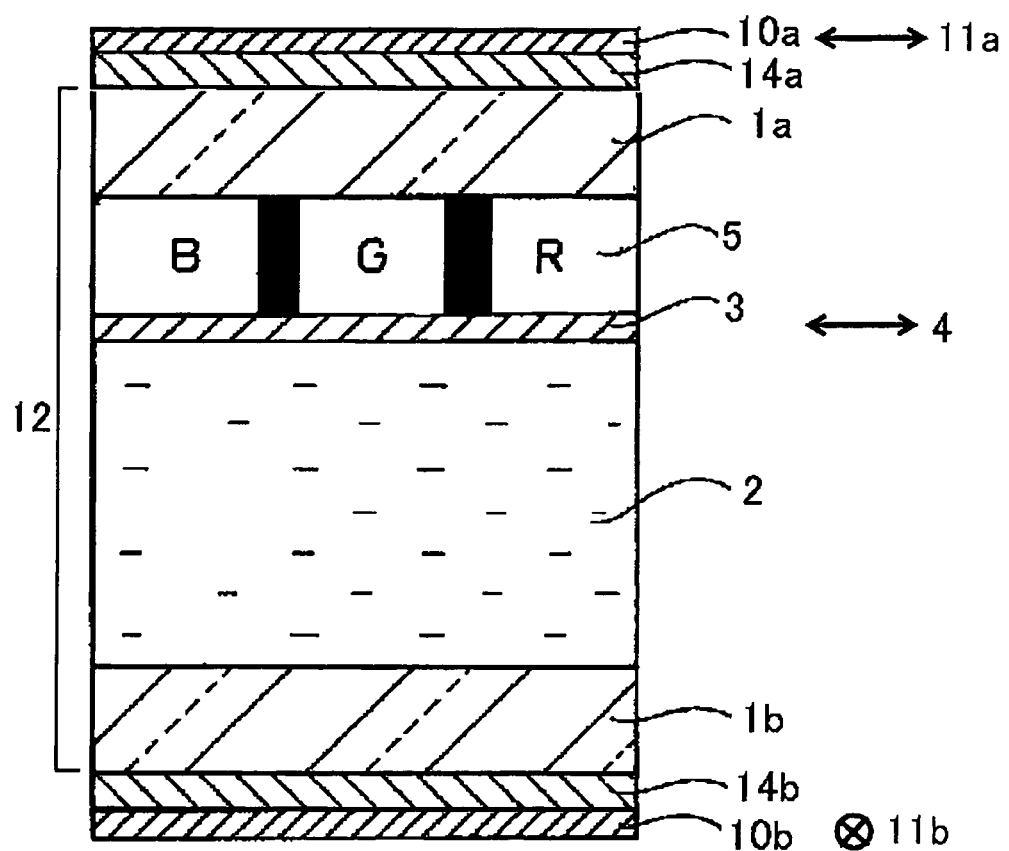

LIQUID-CRYSTAL DISPLAY DEVICE AND LIQUID-CRYSTAL CELL

CROSS-REFERENCE TO RELATED APPLICATIONS

The present invention is a 35 U.S.C. 371 National Stage Entry of PCT/JP2010/057207, filed Apr. 23, 2010, which claims priority from Japanese Patent Application No. 2009-105915, filed on Apr. 24, 2009, the contents of which are all herein incorporated by reference.

TECHNICAL FIELD

The present invention relates to a liquid-crystal display device having an in-cell polarizing layer, and to a liquid-crystal cell.

BACKGROUND ART

For improving the contrast of a liquid-crystal display device, various investigations have been made for reducing the transmitted light in the front direction (that is, in the normal direction to the display panel) at the time of black level of display. In a liquid-crystal color display device, a color filter layer is disposed for each pixel in the cell, and a polarized light is introduced into the color filter layer for displaying a color image. However, the color filter layer has a depolarization effect, and it is known that the light that has been depolarized in the color filter layer scatters thereby causing one reason of increasing the transmitted light at the time of black level of display. As a means for solving the problem of transmitted light increase at the time of black level of display, as caused by the depolarization in the color filter layer, there is known a technique of arranging a polarizing layer between the color filter layer and the liquid-crystal layer in the cell (Patent Reference 1).

On the other hand, various proposals have been made also for improving the oblique-direction contrast in VA-mode liquid-crystal display devices and IPS-mode liquid-crystal display devices; however, all these are to propose arrangement of an optical film having predetermined optical characteristics outside the liquid-crystal cell (for example, Patent References 2 and 3).

CITATION LIST

Patent References

[Patent Reference 1] JP-A 10-161105
[Patent Reference 2] JP-A 2008-3126
[Patent Reference 3] Japanese Patent 4055861

SUMMARY OF INVENTION

Problems to be Resolved by the Invention

The present inventors actually disposed a polarizing layer between a color filter layer and a liquid-crystal layer in a liquid-crystal cell and investigated the transmitted light at the time of black level of display. As a result, the inventors have found that the transmitted light in the front direction could be reduced, however, the transmitted light in oblique directions could not be reduced but rather increased.

Accordingly, the present invention relates to improvement of a liquid-crystal display device having a polarizing layer in the cell thereof, and its object is to provide a liquid-crystal display device having a polarizing layer in the cell thereof, in which the transmitted light is inhibited not only in the front direction but also in oblique directions in the black state, and to provide a liquid-crystal cell to be used in the device.

Means of Solving the Problems

The present inventors have assiduously studied liquid-crystal display devices having a polarizing layer in the cell thereof, and as a result, have found that retardation caused by birefringence of the polarizing layer is relevant to the increase in the transmitted light in oblique directions in the black state. As a result of further investigations, the inventors have found that, even though the polarizing layer has birefringence, when the absorption axis of the in-cell polarizing layer is made parallel to the absorption axis of the polarizing element outside the cell, through which the running light may pass later, and when the sum total of retardation of all the layers through which the light passes while running from the in-cell polarizing layer to the out-cell polarizing element is controlled to fall within a predetermined range, then the increase in the transmitted light in oblique directions can be reduced, and on the basis of these findings, the inventors have made the present invention.

The means of solving the above mentioned problems are as follows.

[1] A liquid-crystal display device comprising first and second polarizing elements, and a liquid-crystal cell disposed between the first and second polarizing elements, wherein:
the liquid-crystal cell comprises first and second substrates (provided that the first substrate is disposed closer to the first polarizing element, and the second substrate is disposed closer to the second polarizing element), a liquid-crystal layer disposed between the first and second substrates, a color filter layer disposed on an inner surface of the first substrate, and an in-cell polarizing layer disposed between the color filter layer and the liquid-crystal layer,
the absorption axis of the first polarizing element and the absorption axis of the in-cell polarizing layer are parallel to each other, and the sum total of the absolute values of retardation in-plane, Re, of all the layers disposed between the in-cell polarizing layer and the first polarizing element is equal to or less than 10 nm, and the sum total of the absolute values of retardation along the thickness-direction, Rth, thereof is equal to or less than 15 nm.

[2] The liquid-crystal display device according to [1], wherein the in-cell polarizing layer is a layer of a liquid-crystal composition comprising at least a dichroic dye.

[3] The liquid-crystal display device according to [2], wherein the dichroic dye is a liquid-crystal compound having an order parameter of equal to or more than 0.85.

[4] The liquid-crystal display device according to any one of [1] to [3], wherein the thickness of the in-cell polarizing layer is from 0.02 to 0.50 μM, and the degree of polarization thereof is from 70 to 99%.

[5] The liquid-crystal display device according to any one of [1] to [4], wherein the in-cell polarizing layer is a layer of a composition comprising at least one azo dye represented by formula (I):

[Formula 1]

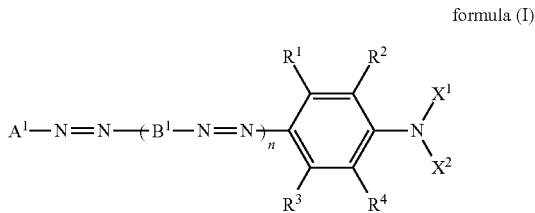

wherein $R^1$, $R^2$, $R^3$, $R^4$, $X^1$ and $X^2$ each independently represent a hydrogen atom or a substituent; $A^1$ represents a phenyl, naphthyl or aromatic heterocyclic group optionally having a substituent; $B^1$ represents a divalent aromatic hydrocarbon or divalent aromatic heterocyclic group optionally having a substituent; n indicates an integer of from 1 to 5; provided that at least one $B^1$ is a phenylene group having an alkyl group.

[6] The liquid-crystal display device according to [5], wherein in formula (I), $A^1$ is a phenyl group optionally having a substituent, $B^1$ is a divalent phenylene group optionally having a substituent, and n is an integer of from 2 to 4.

[7] The liquid-crystal display device according to [5] or [6], wherein the azo dye represented by formula (I) is represented by formula (II):

[Formula 2]

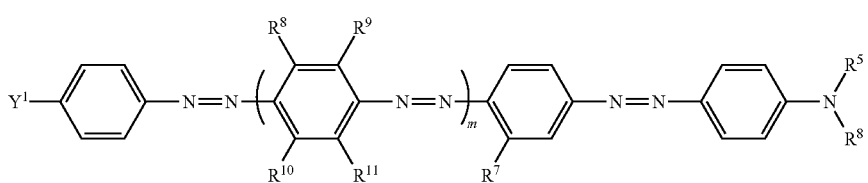

wherein $R^5$, $R^6$ and $R^7$ each independently represent an alkyl group; $R^8$, $R^9$, $R^{10}$ and $R^{11}$ each independently represent a hydrogen atom or a substituent; $Y^1$ represents an alkyl, alkenyl, alkynyl, aryl, alkoxy, alkoxycarbonyl, acyloxy, acylamino, alkoxycarbonylamino, sulfonylamino, sulfamoyl, carbamoyl, alkylthio, sulfonyl or ureido group optionally having a substituent; and m indicates an integer of from 1 to 3.

[8] The liquid-crystal display device according to any one of [1] to [7], comprising, between the liquid-crystal cell and the first polarizing element, a first optical film of which the absolute value of retardation in-plane, Re, is equal to or less than 10 nm and the absolute value of retardation along the thickness-direction, Rth, is equal to or less than 15 nm.

[9] The liquid-crystal display device according to [8], wherein the first optical film is a cellulose acylate film.

[10] The liquid-crystal display device according to [8], wherein the first optical film is an acrylic film.

[11] The liquid-crystal display device according to any one of [1] to [10], in which the liquid-crystal cell is a vertical alignment-mode liquid-crystal cell, and which comprises, between the liquid-crystal cell and the second polarizing element, a second optical film having retardation in-plane, Re, of from 40 to 80 nm and retardation along the thickness-direction, Rth, of from 180 to 250 nm.

[12] The liquid-crystal display device according to any one of [1] to [10], in which the liquid-crystal cell is a horizontal alignment-mode liquid-crystal cell, and which comprises, between the liquid-crystal cell and the second polarizing element, a second optical film, having retardation in-plane, Re, of from 180 to 300 nm and retardation along the thickness, Rth, of from −30 to 30 nm, or having retardation in-plane, Re, of from 80 to 160 nm and retardation along the thickness, Rth, of from −50 to −110 nm.

[13] A liquid-crystal cell comprising a pair of substrates, a liquid-crystal layer disposed between the pair of substrates, a color filter layer disposed on an inner surface of one of the pair of substrates, and an in-cell polarizing layer disposed between the color filter layer and the liquid-crystal layer, wherein the in-cell polarizing layer is a layer of a composition comprising at least one azo dye represented by formula (I):

[Formula 3]

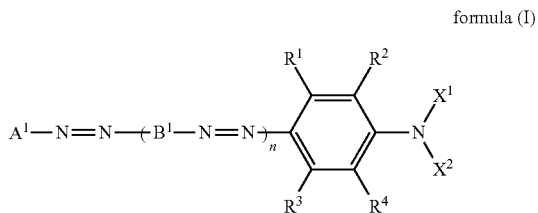

wherein $R^1$, $R^2$, $R^3$, $R^4$, $X^1$ and $X^2$ each independently represent a hydrogen atom or a substituent; $A^1$ represents a phenyl, naphthyl or aromatic heterocyclic group optionally having a substituent; $B^1$ represents a divalent aromatic hydrocarbon or divalent aromatic heterocyclic group optionally having a substituent; n indicates an integer of from 1 to 5; provided that at least one $B^1$ is a phenylene group having an alkyl group.

Advantage of the Invention

According to the invention, a liquid-crystal display device having a polarizing layer inside the cell thereof can be improved, or that is, there can be provided a liquid-crystal display device having a polarizing layer inside the cell thereof in which the transmitted light not only in the front direction but also in oblique directions can be reduced at the time of black level of display, and a liquid-crystal cell usable in the device.

BRIEF DESCRIPTION OF THE DRAWING

[FIG. 1] This is a schematic cross-sectional view of one example of the liquid-crystal display device of the invention.

MODE FOR CARRYING OUT THE INVENTION

The invention is described in detail hereinunder. In this description, the numerical range expressed by the wording "a number to another number" means the range that falls between the former number indicating the lowermost limit of the range and the latter number indicating the uppermost limit thereof.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selectivity of the measurement wavelength $\lambda$ nm may be conducted by a manual exchange of a wavelength-filter, a program conversion of a measurement wavelength value or the like.

When a film to be analyzed is expressed by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (21) and (22):

[Numerical Formula 1]

$$Re(\theta) = \frac{\left[ nx - \frac{(ny \times nz)}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times d}{\cos\left\{\sin^{-1}\left(\frac{\sin(-\theta)}{nx}\right)\right\}} \quad \text{Numerical formula (21)}$$

$$Rth = \left(\frac{nx + ny}{2} - nz\right) \times d \quad \text{Numerical formula (22)}$$

$Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. On the basis of thus-calculated nx, ny and nz, $Nz=(nx-nz)/(nx-ny)$ is further calculated.

In the description, the measurement wavelength for Re, Rth or a refractive index is $\lambda=550$ nm, unless otherwise specifically noted.

FIG. 1 shows a schematic cross-sectional view of one example of the liquid-crystal display device of the invention. The liquid-crystal display device of FIG. 1 has a first polarizing element 10a and a second polarizing element 10b, a liquid-crystal cell 12 disposed between them, a first optical film 14a between the first polarizing element 10a and the liquid-crystal cell 12, and a second optical film 14b between the second polarizing element 10b and the liquid-crystal cell 12. The absorption axes 11a and 11b of the first and second polarizing elements 10a and 10b are perpendicular to each other. The liquid-crystal cell 12 has, between the first substrate 1a and the second substrate 1b, a liquid-crystal layer 2 of a liquid-crystal material, a color filter 5 disposed on the inner surface of the first substrate 1a, and an in-cell polarizing layer 3 between the color filter layer 5 and the liquid-crystal layer 2. The absorption axis 4 of the in-cell polarizing layer 3 is parallel to the absorption axis 11a of the first polarizing element 10a that is positioned closer to the substrate 1a on which the in-cell polarizing layer 3 is formed.

The in-cell polarizing layer 3 is a layer having an effect of compensating the depolarization by the color filter 5. In order that the depolarization effect of the color filter 5 could be equal to or less than ⅓, as compared with that in an embodiment not having the in-cell polarizing layer 3, the degree of polarization of the in-cell polarizing layer 3 is preferably equal to or more than 70%, more preferably equal to or more than 80%. The degree of polarization is proportional to the thickness of the layer, and therefore, in order to increase the degree of polarization thereof, the layer must have a thickness in some degree; however, when the layer to be disposed inside the cell is too thick, then the brightness in the white state tends to lower. Taking this point into consideration, the thickness of the in-cell polarizing layer 3 is preferably from 0.02 to 0.50 nm or so. For forming the polarizing layer of which the thickness falls within the range and which has a high degree of polarization falling within the above-mentioned range, it is desirable that a liquid-crystal composition containing a dichroic dye is employed as described below. Examples of the material and the formation method preferred for use in forming in-cell polarizing layer 3 are descried below.

In the liquid-crystal display device of this embodiment, the depolarization by the color filter layer 5 is reduced by the in-cell polarizing layer 3, and therefore the increase in the transmitted light in the front direction can be retarded and the contrast is thereby improved. Further, in the liquid-crystal display device of this embodiment, the absorption axis 4 of the in-cell polarizing layer 3 is parallel to the absorption axis 11a of the first polarizing element 10a, and the sum total of the absolute values of retardation in plane, Re, of all the layers disposed between the in-cell polarizing layer 3 and the first polarizing element 10a is equal to or less than 10 nm (preferably equal to or less than 8 nm, more preferably equal to or less than 5 nm), and the sum total of the absolute values of retardation along the thickness-direction, Rth, thereof is equal to or less than 15 nm (preferably equal to or less than 12 nm, more preferably equal to or less than 10 nm). In FIG. 1, as the layers to be disposed between the in-cell polarizing layer 3 and the first polarizing element 10a, only the color filter layer 5, the substrate 1a and the first optical film 14a are shown and the other layers are omitted; however, any other functional layers may exist therein. In this, for example, between the layers outside the cell, an adhesive layer and the like may exist, and an alignment film to be used for forming the polarizing layer and the like may exist outside the cell; and needless-to-say, all these layers are included in this embodiment. In other words, all the layers through which the running light passes from the in-cell polarizing layer 3 to the first polarizing element 10a are meant herein. When the sum total of the absolute values of Re and Rth of all those layers falls within the above-mentioned range, and even though the linearly-polarized light that passes through the in-cell polarizing layer 3 is influenced by retardation attributed to birefringence of the in-cell polarizing layer 3, the running light may be influenced little by retardation thereafter up to reaching the first polarizing element 10a, and the increase in the transmitted light in oblique directions can be thereby prevented. This effect can be explained as the movement on a Poincare sphere. Briefly, the polarized light having passed through the in-cell polarizing layer 3 is expressed as the polarization state X that rotates around the axis A corresponding to the slow axis of the polarizing layer 3, and when the sum total of the absolute values of the above-mentioned Re and Rth is controlled to fall within the above-mentioned range, then the distance between the polarization state X and the axis A can be kept constant, and the running light is influenced little by retardation of the polarizing layer 3.

It may be understood from the above description that the effect of the invention can be attained in any embodiment of liquid-crystal display devices of any liquid-crystal mode irrespective of the alignment state of the liquid-crystal layer in the black state; but on the other hand, depending on the display mode, a retardation film having Re and/or Re that is large in some degree must be disposed on and below the liquid-crystal cell for optical compensation of birefringence of the liquid-crystal cell in the black state, and as the case may be, the above-mentioned condition would be difficult to satisfy. For satisfying the above-mentioned condition, it is at least necessary that the absolute value of Re of the first optical film 14a is equal to or less than 10 nm and the absolute value of Rth thereof is equal to or less than 15 nm. Taking this point in consideration, preferred embodiments of the invention are vertical alignment mode and horizontal alignment mode (IPS and FFS mode) liquid-crystal display devices. These embodiments are described below.

First described is a vertical alignment mode liquid-crystal display device.

As a method of controlling the transmitted light in oblique directions in the black state of vertical alignment mode liquid-crystal display devices, there is proposed use of a biaxial optical film having Re of from 40 to 80 nm and Rth of from 180 to 250 nm between any one of the pair of polarizing elements and the VA-mode liquid-crystal cell therein. Accordingly, as the second optical film 14b in FIG. 1, when the biaxial optical film is used, then a film having small Re and Rth and satisfying the above-mentioned condition may be used as the first optical film 14a. According to the embodiment, therefore, it is possible to attain not only the effect of improving the contrast in the front direction by the polarizing layer 3 disposed inside the cell but also the effect of improving the contrast in oblique directions by the second optical film 14b.

The biaxial optical film usable as the second optical film is described in detail in JP-A2008-3126.

As a method of controlling the transmitted light in oblique directions in the black state of IPS-mode liquid-crystal display devices, there is proposed use of a biaxial optical film having Re of from 180 to 300 nm and Rth of from −30 to 30 nm between any one of the pair of polarizing elements and the IPS-mode liquid-crystal cell therein; or a biaxial optical film having Re of from 80 to 160 nm and Rth of from −50 to −110 nm therebetween. Accordingly, as the second optical film 14b in FIG. 1, when any of those biaxial optical films is used, then a film having small Re and Rth and satisfying the above-mentioned condition may be used as the first optical film 14a. According to the embodiment, therefore, it is possible to attain not only the effect of improving the contrast in the front direction by the polarizing layer 3 disposed inside the cell but also the effect of improving the contrast in oblique directions by the second optical film 14b. The biaxial optical film usable as the second optical film is described in detail in JP-A 11-305217.

FIG. 1 shows the embodiment having the first optical film 14a between the first polarizing element 10a and the liquid-crystal cell 12, but if possible, the first optical film 14a may be omitted here. Onto the outer surface of the first substrate 1a of the liquid-crystal cell 12, a polarizing film that acts as the first polarizing element 10a may be directly stuck, using an adhesive or the like. Not specifically defined, the adhesive to be used for the sticking may be selected suitably from various adhesives depending on the materials of the substrate and the polarizing film.

In FIG. 1, the electrode layer, the alignment film and others to be disposed in the liquid-crystal cell are omitted; however, needless-to-say, the liquid-crystal display device and the liquid-crystal cell of the invention contain all the constitutive members of an ordinary liquid-crystal display device including those layers. In FIG. 1, the first and second optical films are single layers; however, the first and second optical films may be multilayered optical films of two or more layers. Needless-to-say, the first and second optical films may serve also as the protective films for the first and second polarizing elements, respectively.

Next described in detail are various members for use in the liquid-crystal display device and the liquid-crystal cell of the invention. First, the polarizing layer to be disposed inside the liquid-crystal cell (in-cell polarizing layer) is described.

(In-Cell Polarizing Layer)

In one embodiment of the liquid-crystal display device of the invention, the in-cell polarizing layer is formed of a liquid-crystal composition containing at least a dichroic dye. In this description, "dichroic dye" means a dye of which the absorption wavelength differs in different directions. The dichroic dye may be non-liquid-crystalline or liquid-crystalline. In case where the dichroic dye to be used is non-liquid-crystalline, it may be mixed with a liquid-crystal compound to prepare the intended liquid-crystal composition. The effect of reducing the depolarization by the color filter layer may increase when the degree of polarization of the in-cell polarizing layer is higher; but on the other hand, when a polarizing layer having a high degree of polarization is formed of a liquid-crystal composition, the layer to be formed shall be thick in some degree, and this will be against the request for reducing the thickness of the liquid-crystal cell. In case where the dichroic dye to be used in forming the in-cell polarizing layer is a liquid-crystal compound having a high degree of orientation order, a polarizing layer having a high degree of polarization can be formed even though it is thin, and the embodiment is favorable since the reduction in the brightness in the bright state can be retarded. In the invention, the degree of orientation order of the dichroic dye means the degree of orientation order of the transition moment of absorption thereof. Preferably, the degree of orientation order (order parameter) of the dichroic dye is equal to or more than 0.85, more preferably equal to or more than 0.90. The order parameter is preferably higher, but the order parameter of an organic compound is generally at most 0.98.

The order parameter S of the dichroic dye can be computed as $S=(D-1)/(D+2)$, for which the dichroic ratio D of polarized absorption of the dye is measured using a spectrophotometer.

Examples of the dichroic dye having a high order parameter include azo dyes represented by formula (I).

[Formula 4]

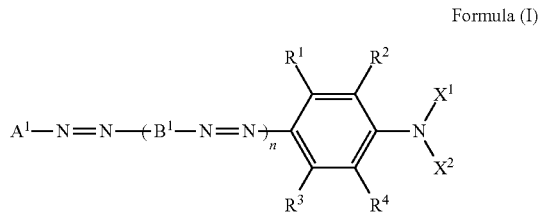

Formula (I)

In the formula, $R^1$, $R^2$, $R^3$, $R^4$, $X^1$ and $X^2$ each independently represent a hydrogen atom or a substituent; $A^1$ represents a phenyl, naphthyl or aromatic heterocyclic group optionally having a substituent; $B^1$ represents a divalent aromatic hydrocarbon or divalent aromatic heterocyclic group optionally having a substituent; n indicates an integer of from 1 to 5; provided that at least one $B^1$ is a phenylene group having an alkyl group.

Examples of the substituent represented by $R^1$, $R^2$, $R^3$, $R^4$, $X^1$ or $X^2$ include those shown below.

alkyls (preferably $C_{1-20}$, more preferably $C_{1-12}$ and even more preferably $C_{1-8}$ alkyls such as methyl, ethyl, isopropyl, tert-butyl, n-octyl, n-decyl, n-hexadecyl, cyclopropyl, cyclopentyl and cyclohexyl), alkenyls (preferably $C_{2-20}$, more preferably $C_{2-12}$ and even more preferably $C_{2-8}$ alkenyls such as vinyl, allyl, 2-butenyl and 3-pentenyl), alkynyls (preferably $C_{2-20}$, more preferably $C_{2-12}$ and even more preferably $C_{2-8}$ alkynyls such as propargyl and 3-pentynyl), aryls (preferably $C_{6-30}$, more preferably $C_{6-20}$ and even more preferably $C_{6-12}$ aryls such as phenyl, 2,6-diethyl phenyl, 3,5-ditrifluoromethyl phenyl, naphthyl and biphenyl), substituted or non-substituted aminos (preferably $C_{0-20}$, more preferably $C_{0-10}$ and even more preferably $C_{0-6}$ aminos such as non-substituted amino, ethylamino, dimethylamino, diethylamino and anilino), alkoxys (preferably $C_{1-20}$, more preferably $C_{1-10}$ and even more preferably $C_{1-6}$ alkoxys such as methoxy, ethoxy and butoxy), alkoxycarbonyls (preferably $C_{2-20}$, more preferably $C_{2-15}$ and even more preferably $C_{2-10}$ alkoxycarbonyls such as methoxycarbonyl and ethoxycarbonyl), acyloxys (preferably $C_{2-20}$, more preferably $C_{2-10}$ and even more preferably $C_{2-6}$ acyloxys such as acetoxy and benzoyloxy), acylaminos (preferably $C_{2-20}$, more preferably $C_{2-10}$ and even more preferably $C_{2-6}$ acylaminos such as acetylamino and benzoylamino), alkoxycarbonylaminos (preferably $C_{2-20}$, more preferably $C_{2-10}$ and even more preferably $C_{2-6}$ alkoxycarbonylaminos such as methoxycarbonylamino), aryloxycarbonylaminos (preferably $C_{7-20}$, more preferably $C_{7-16}$ and even more preferably $C_{7-12}$ aryloxycarbonylaminos such as phenyloxycarbonylamino), sulfonylaminos (preferably $C_{1-20}$, more preferably $C_{1-10}$ and even more preferably $C_{1-6}$ sulfonylaminos such as methane sulfonylamino and benzene sulfonylamino), sulfamoyls (preferably $C_{0-20}$, more preferably $C_{0-10}$ and even more preferably $C_{0-6}$ sulfamoyls such as non-substituted sulfamoyl, methyl sulfamoyl, dimethyl sulfamoyl and phenyl sulfamoyl), carbamoyls (preferably $C_{1-20}$, more preferably $C_{1-10}$ and even more preferably $C_{1-6}$ carbamoyls such as non-substituted carbamoyl, methyl carbamoyl, diethyl carbamoyl and phenylcarbamoyl), alkylthios (preferably $C_{1-20}$, more preferably $C_{1-10}$ and even more preferably $C_{1-6}$ alkylthios such as methylthio and ethylthio), arylthios (preferably $C_{6-20}$, more preferably $C_{6-16}$ and even more preferably $C_{6-12}$ arylthios such as phenylthio), sulfonyls (preferably $C_{1-20}$, more preferably $C_{1-10}$ and even more preferably $C_{1-6}$ sulfonyls such as mesyl and tosyl), sulfinyls (preferably $C_{1-20}$, more preferably $C_{1-10}$ and even more preferably $C_{1-6}$ sulfinyls such as methane sulfinyl and benzene sulfinyl), ureidos (preferably $C_{1-20}$, more preferably $C_{1-10}$ and even more preferably $C_{1-6}$ ureidos such as non-substituted ureido, methyl ureido and phenyl ureido), amide phosphate group (preferably $C_{1-20}$, more preferably $C_{1-10}$ and even more preferably $C_{1-6}$ amide phosphate group such as diethyl amide phosphate and phenyl amide phosphate), hydroxy, mercapto, halogen atoms (for example, fluorine atom, chlorine atom, bromine atom and iodine atom), cyano, nitro, hydroxamic group, imino (—CH=N— or —N=CH—), azo group, heterocyclic group (preferably $C_{1-30}$ and more preferably $C_{1-12}$ heterocyclic group having at least one hetero atom selected from nitrogen atom, oxygen atom, sulfur atom and so on including imidazolyl, pyridyl, quinolyl, furyl, piperidyl, morpholino, benzoxazolyl, benzoimidazolyl and benzothiazolyl), and silyl group (preferably $C_{3-40}$, more preferably $C_{3-30}$ and even more preferably $C_{3-24}$ silyl group such as trimethyl silyl and triphenyl silyl.

These substituents may have one or more substituents. Two or more substituents may be same or different. And they may combine to form a ring.

Preferably, $R^1$-$R^4$ represent a hydrogen atom, alkyl, alkoxy or halogen atom, especially preferably, a hydrogen atom, alkyl, alkoxy or halogen atom, or most preferably, a hydrogen atom. Especially preferably, $X^1$ and $X^2$ represent a hydrogen atom or alkyl, or most preferably, an alkyl.

$A^1$ represents a phenyl, naphthyl or aromatic heterocyclic group optionally having a substituent.

The optional substituent of the phenyl or naphthyl is preferably a group to be introduced for improving the solubility of the azo compound, an electron-releasing or electron-withdrawing group to be introduced for adjusting the color tone as the dye, or a group having any polymerizable group for fixing the alignment state; and concretely, the examples of the substituent represented by $R^1$-$R^4$, $X^1$ and $X^2$ are exemplified. Preferably, an alkyl optionally having a substituent, an alkenyl optionally having a substituent, an alkynyl optionally having a substituent, an aryl optionally having a substituent, an alkoxy optionally having a substituent, an alkoxycarbonyl optionally having a substituent, an acyloxy optionally having a substituent, an acylamino optionally having a substituent, an amino optionally having a substituent, an alkoxycarbonylamino optionally having a substituent, a sulfonylamino optionally having a substituent, a sulfamoyl optionally having a substituent, a carbamoyl optionally having a substituent, an alkylthio optionally having a substituent, a sulfonyl optionally having a substituent, a ureido optionally having a substituent, nitro, hydroxy, cyano, or a halogen atom is exemplified.

The alkyl is preferably a $C_{1-20}$ alkyl, or especially preferably a $C_{1-12}$ alkyl. As the optional substituent of the alkyl, an alkoxy, acyloxy, hydroxy or halogen atom is exemplified.

As the optional substitution of the alkyl, a polymerizable group is preferably exemplified. The polymerizable group is not limited; however, preferably, the polymerization reaction is an addition polymerization (including ring-opening polymerization) or a condensation polymerization. Or in other words, the polymerizable group is preferably an addition polymerizable group or a condensation polymerizable group.

Examples of the polymerizable group include, but are not limited to, those shown below.

[Formula 5]

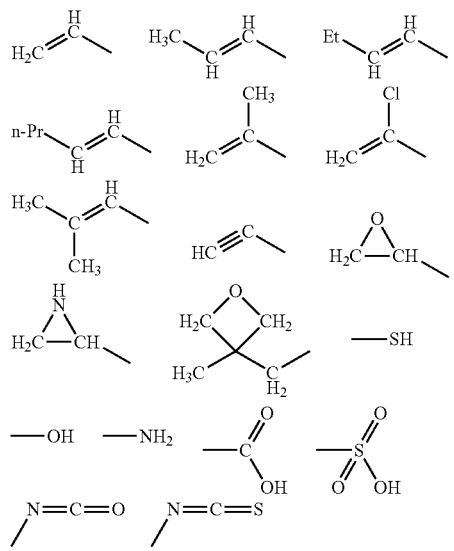

As the polymerizable group, a radical polymerizable group or a cationic polymerizable group is preferable. As the radical polymerizable group, any known radical polymerizable group may be used, and (meth)acrylate group is preferable. As the cationic polymerizable group, any known cationic polymerizable group may be used; and, concretely, a cycloaliphatic ether group, cyclic acetal group, cyclic lactone group, cyclic thioether group, spiro-ortho ether group, or vinyloxy group is exemplified. Among these, a cycloaliphatic ether group or vinyloxy group is preferable; and epoxy, oxetanyl or vinyloxy is especially preferable.

The alkenyl is preferably a $C_{2-20}$ alkenyl, or especially preferably a $C_{2-12}$ alkenyl. The optional substituent of the alkenyl is same as the optional substituent of the alkyl, and the preferable scope thereof is same as that of the optional substituent of the alkyl.

The alkynyl is preferably a $C_{2-20}$ alkynyl, or especially preferably a $C_{2-12}$ alkynyl. The optional substituent of the alkynyl is same as the optional substituent of the alkyl, and the preferable scope thereof is same as that of the optional substituent of the alkyl.

The aryl is preferably a $C_{6-20}$ aryl, or especially preferably a $C_{6-12}$ aryl. The optional substituent of the aryl is same as the optional substituent of the alkyl, and the preferable scope thereof is same as that of the optional substituent of the alkyl.

The alkoxy is preferably a $C_{1-20}$ alkoxy, or especially preferably a $C_{1-12}$ alkoxy. The optional substituent of the alkoxy is same as the optional substituent of the alkyl, and the preferable scope thereof is same as that of the optional substituent of the alkyl.

The alkoxycarbonyl is preferably a $C_{2-20}$ alkoxycarbonyl, or especially preferably a $C_{2-12}$ alkoxycarbonyl. The optional substituent of the alkoxycarbonyl is same as the optional substituent of the alkyl, and the preferable scope thereof is same as that of the optional substituent of the alkyl.

The acyloxy is preferably a $C_{2-20}$ acyloxy, or especially preferably a $C_{2-12}$ acyloxy. The optional substituent of the acyloxy is same as the optional substituent of the alkyl, and the preferable scope thereof is same as that of the optional substituent of the alkyl.

The amino is preferably a $C_{1-20}$ amino, or especially preferably a $C_{1-12}$ amino. The optional substituent of the amino is same as the optional substituent of the alkyl, and the preferable scope thereof is same as that of the optional substituent of the alkyl.

The acylamino is preferably a $C_{1-20}$ acylamino, or especially preferably a $C_{1-12}$ acylamino. The optional substituent of the acylamino is same as the optional substituent of the alkyl, and the preferable scope thereof is same as that of the optional substituent of the alkyl.

The alkoxycarbonylamino is preferably a $C_{2-20}$ alkenyl, or especially preferably a $C_{2-12}$ alkoxycarbonylamino. The optional substituent of the alkoxycarbonylamino is same as the optional substituent of the alkyl, and the preferable scope thereof is same as that of the optional substituent of the alkyl.

The sulfonylamino is preferably a $C_{1-20}$ alkenyl, or especially preferably a $C_{1-12}$ sulfonylamino. The optional substituent of the sulfonylamino is same as the optional substituent of the alkyl, and the preferable scope thereof is same as that of the optional substituent of the alkyl.

The sulfamoyl is preferably a $C_{1-20}$ sulfamoyl, or especially preferably a $C_{1-12}$ sulfamoyl. The optional substituent of the sulfamoyl is same as the optional substituent of the alkyl, and the preferable scope thereof is same as that of the optional substituent of the alkyl.

The carbamoyl is preferably a $C_{1-20}$ carbamoyl, or especially preferably a $C_{1-12}$ carbamoyl. The optional substituent of the carbamoyl is same as the optional substituent of the alkyl, and the preferable scope thereof is same as that of the optional substituent of the alkyl.

The alkylthio is preferably a $C_{1-20}$ alkylthio, or especially preferably a $C_{1-12}$ alkylthio. The optional substituent of the alkylthio is same as the optional substituent of the alkyl, and the preferable scope thereof is same as that of the optional substituent of the alkyl.

The sulfonyl is preferably a $C_{1-20}$ alkylthio, or especially preferably a $C_{1-12}$ sulfonyl. The optional substituent of the alkylthio is same as the optional substituent of the sulfonyl, and the preferable scope thereof is same as that of the optional substituent of the alkyl.

The ureido is preferably a $C_{2-20}$ ureido, or especially preferably a $C_{2-12}$ ureido. The optional substituent of the ureido is same as the optional substituent of the sulfonyl, and the preferable scope thereof is same as that of the optional substituent of the alkyl.

The phenyl or the naphthyl may have 1-5 substituents, or preferably 1 or 2 substituents.

As the aromatic heterocyclic group, a group derived from a monocyclic or bicyclic structure is preferable. As the atom other than carbon atom embedded in the aromatic heterocyclic group, a nitrogen, sulfur, or oxygen atom is exemplified. If the aromatic heterocyclic group has plural atoms other than carbon atom, they are same or different from each other. As the aromatic heterocyclic group, pyridyl, quinolyl, thiazolyl, benzothiazolyl, quinololyl, naphthalimido, or each of those shown below is exemplified.

[Formula 6]

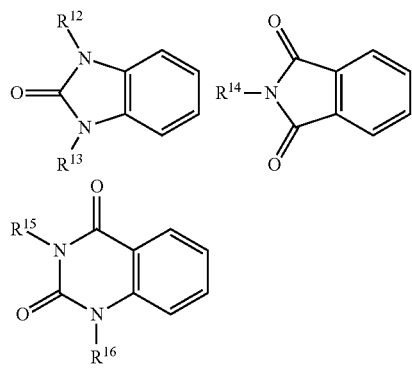

In the formula, $R^{12}$-$R^{16}$ each independently represent a hydrogen atom, an alkyl optionally having a substituent, or a phenyl optionally having a substituent. The optional substituent of each of thereof is same as the optional substituent of the sulfonyl, and the preferable scope thereof is same as that of the optional substituent of the alkyl.

As the aromatic heterocyclic group, pyridyl, quinolyl or naphthalimido is preferable.

$A^1$ especially preferably represents a phenyl optionally having a substituent.

$B^1$ represents a divalent aromatic hydrocarbon or divalent aromatic heterocyclic group optionally having a substituent, provided that at least one $B^1$ is a phenylene group having an alkyl group. The alkyl is preferably a $C_{1-20}$ alkyl, more preferably a $C_{1-12}$ alkyl or even more preferably a $C_{1-8}$ alkyl; and methyl, ethyl, isopropyl, tert-butyl, n-octyl, n-decyl, n-hexadecyl, cyclopropyl, cyclopentyl or cyclohexyl is exemplified. Methyl or ethyl is especially preferable, and methyl is most preferable.

As the aromatic hydrocarbon group represented by $B^1$, phenylene or naphthylene is preferable. As the optional substituent thereof, exemplified is an alkyl optionally having a substituent, an alkoxy optionally having a substituent, hydroxy, nitro, a halogen atom, an amino optionally having a substituent, an acylamino optionally having a substituent, or cyano. The preferable number of carbon atom of the alkyl optionally having a substituent, the alkoxy optionally having a substituent, the amino optionally having a substituent, or the acylamino optionally having a substituent, and examples of the optional substituent thereof are same as those exemplified for the embodiment in which $A^1$ is a phenyl or naphthyl, and the preferable scope thereof is also same.

As the aromatic heterocyclic group represented by $B^1$, a group derived from a monocyclic or bicyclic structure is preferable. As the atom other than carbon atom embedded in the aromatic heterocyclic group, a nitrogen, sulfur, or oxygen atom is exemplified; and a nitrogen atom is especially preferable. If the aromatic heterocyclic group has plural atoms other than carbon atom, they are same or different from each other. As the aromatic heterocyclic group, pyridine-diyl, quinoline-diyl, isoquinoline-diyl, benzothiazole-diyl or phthalimido-diyl is exemplified. Among these, quinoline-diyl or isoquinoline-diyl is preferable.

As the optional substituent of the aromatic heterocyclic group, an alkyl such as methyl and ethyl, an alkoxy such as methoxy and ethoxy, an amino such as non-substituted amino and methylamino, acetylamino, nitro, hydroxy, cyano, or a halogen atom is exemplified.

$B^1$ especially preferably represents a divalent phenylene optionally having a substituent.

n is an integer of from 1 to 5, or is preferably an integer of from 2 to 4.

Among the azo dyes represented by formula (I), the azo dyes represented by formula (II) are especially preferable.

[Formula 7]

Formula (II)

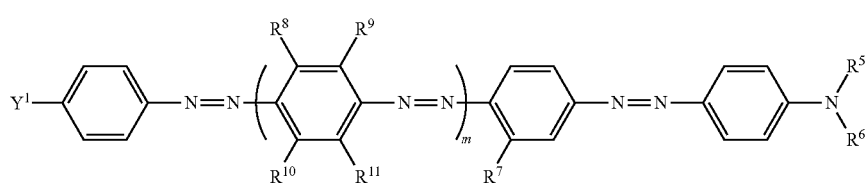

In the formula, $R^5$, $R^6$ and $R^7$ each independently represent an alkyl group; $R^8$, $R^9$, $R^{10}$ and $R^{11}$ each independently represent a hydrogen atom or a substituent; $Y^1$ represents an alkyl, alkenyl, alkynyl, aryl, alkoxy, alkoxycarbonyl, acyloxy, acylamino, alkoxycarbonylamino, sulfonylamino, sulfamoyl, carbamoyl, alkylthio, sulfonyl or ureido group optionally having a substituent; and m indicates an integer of from 1 to 3.

The alkyl represented by $R^5$-$R^7$ is same as the alkyl described above for $X^1$ and $X^2$ in formula (I), and the preferable scope thereof is also same. The alkyl represented by $R^5$-$R^7$ is especially preferably methyl or ethyl. The alkyl represented by $R^7$ is most preferably methyl.

The substitution represented by $R^8$-$R^{11}$ is same as the substitution represented by $B^1$ in formula (I), and the preferable scope thereof is also same.

The alkyl, alkenyl, alkynyl, aryl, alkoxy, alkoxycarbonyl, acyloxy, acylamino, alkoxycarbonylamino, sulfonylamino, sulfamoyl, carbamoyl, alkylthio, sulfonyl or ureido group optionally having a substituent represented by $Y^1$ is same as each of those represented by $A^1$ in formula (I); and he preferable scope thereof is also same. Preferably, $Y^1$ represents an alkyl, aryl, alkoxy, alkoxycarbonyl, acyloxy, acylamino, sulfonylamino, sulfamoyl, carbamoyl, alkylthio or sulfonyl group; especially preferably, $Y^1$ represents an alkyl, aryl, alkoxy, alkoxycarbonyl, acyloxy or alkylthio group; or most preferably, $Y^1$ represents an alkyl, aryl or alkoxy group.

Examples of the azo dye represented by formula (I) include, but are not limited to, those shown below.

[Formula 8]

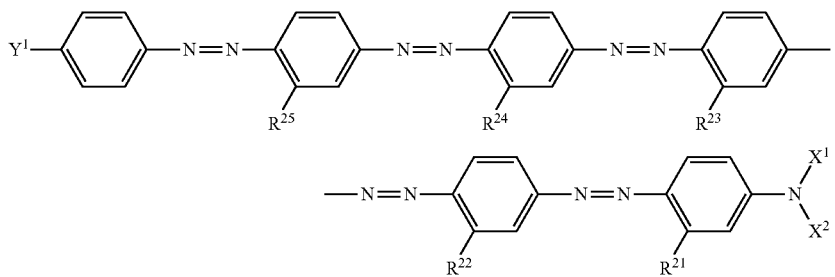

| No. | $X^1$ | $X^2$ | $R^{21}$ | $R^{22}$ | $R^{23}$ | $R^{24}$ | $R^{25}$ | $Y^1$ |
|-----|-------|-------|----------|----------|----------|----------|----------|-------|
| A-1 | —$C_2H_5$ | —$C_2H_5$ | —H | —$CH_3$ | —H | —H | —H | —$C_4H_9$ |
| A-2 | —$C_2H_5$ | —$C_2H_5$ | —H | —$CH_3$ | —$CH_3$ | —$CH_3$ | —H | —$C_4H_9$ |
| A-3 | —$CH_3$ | —$CH_3$ | —H | —$CH_3$ | —H | —H | —H | —$C_4H_9$ |

[Formula 9]

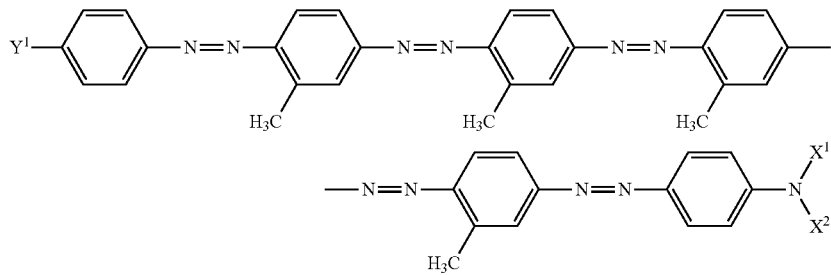

| No. | $X^1$ | $X^2$ | $Y^1$ |
|-----|-------|-------|-------|
| A-4 | —$C_2H_5$ | —$C_2H_5$ | —O—C(O)—C$_6$H$_4$—O(CH$_2$)$_4$OCOCH=CH$_2$ |
| A-5 | —$C_2H_5$ | —$C_2H_5$ | —O—C(O)—C$_6$H$_4$—O(CH$_2$)$_{11}$OCOCH=CH$_2$ |
| A-6 | —CONH(CH$_2$)$_2$OCOC(CH$_3$)=CH$_2$ | —H | —$C_4H_9$ |
| A-7 | —CONH(CH$_2$)$_2$OCOC(CH$_3$)=CH$_2$ | —$C_2H_5$ | —$C_4H_9$ |
| A-8 | —CONH(CH$_2$)$_2$OCOC(CH$_3$)=CH$_2$ | —$C_2H_5$ | —O—C(O)—C$_6$H$_4$—O(CH$_2$)$_4$OCOCH=CH$_2$ |

[Formula 10]

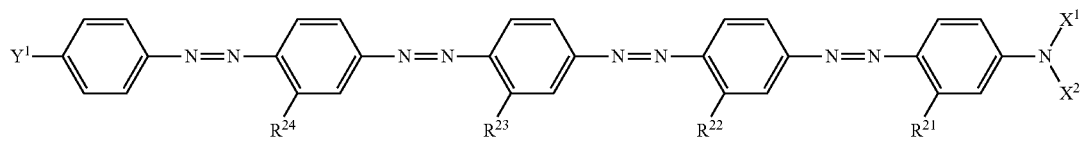

| No. | X¹ | X² | R²¹ | R²² | R²³ | R²⁴ | Y¹ |
|---|---|---|---|---|---|---|---|
| A-9  | —C₂H₅ | —C₂H₅ | —H | —CH₃ | —H | —H | —C₄H₉ |
| A-10 | —C₂H₅ | —C₂H₅ | —CH₃ | —CH₃ | —H | —H | —C₄H₉ |
| A-11 | —C₂H₅ | —C₂H₅ | —H | —CH₃ | —CH₃ | —CH₃ | —C₄H₉ |
| A-12 | —CONH(CH₂)₂OCOC(CH₃)=CH₂ | —H | —H | —CH₃ | —H | —H | —C₄H₉ |
| A-13 | —CONH(CH₂)₂OCOC(CH₃)=CH₂ | —C₂H₅ | —H | —CH₃ | —H | —H | —C₄H₉ |
| A-14 | —CONH(CH₂)₂OCOC(CH₃)=CH₂ | —C₂H₅ | —H | —CH₃ | —CH₃ | —CH₃ | —O—C(=O)—C₆H₄—O(CH₂)₄OCOCH=CH₂ |
| A-15 | —C₂H₅ | —C₂H₅ | —H | —CH₃ | —CH₃ | —CH₃ | —O—C(=O)—C₆H₄—O(CH₂)₄OCOCH=CH₂ |

[Formula 11]

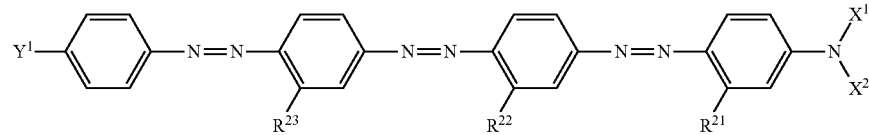

| No. | X¹ | X² | R²¹ | R²² | R²³ | Y¹ |
|---|---|---|---|---|---|---|
| A-16 | —C₂H₅ | —C₂H₅ | —H | —CH₃ | —H | —C₄H₉ |
| A-17 | —C₂H₅ | —C₂H₅ | —H | —CH₃ | —CH₃ | —C₄H₉ |
| A-18 | —C₂H₅ | —C₂H₅ | —H | —CH₃ | —H | —O—C(=O)—C₆H₄—O(CH₂)₄OCOCH=CH₂ |
| A-19 | —C₂H₅ | —C₂H₅ | —H | —CH₃ | —H | —O—C(=O)—C₆H₄—O(CH₂)₁₁OCOCH=CH₂ |
| A-20 | —CONH(CH₂)₂OCOC(CH₃)=CH₂ | —H | —H | —CH₃ | —H | —C₄H₉ |
| A-21 | —CONH(CH₂)₂OCOC(CH₃)=CH₂ | —C₂H₅ | —H | —CH₃ | —H | —C₄H₉ |
| A-22 | —CONH(CH₂)₂OCOC(CH₃)=CH₂ | —C₂H₅ | —H | —CH₃ | —H | —O—C(=O)—C₆H₄—O(CH₂)₄OCOCH=CH₂ |
| A-23 | —CONH(CH₂)₂OCOC(CH₃)=CH₂ | —C₂H₅ | —H | —CH₃ | —H | —O—C(=O)—C₆H₄—O(CH₂)₁₁OCOCH=CH₂ |
| A-24 | —C₂H₅ | —C₂H₅ | —OCH₃ | —CH₃ | —H | —C₄H₉ |
| A-25 | —C₂H₅ | —C₂H₅ | —H | —CH₃ | —CH₃ | —O—C(=O)—C₆H₄—O(CH₂)₄OCOCH=CH₂ |

-continued
[Formula 11]
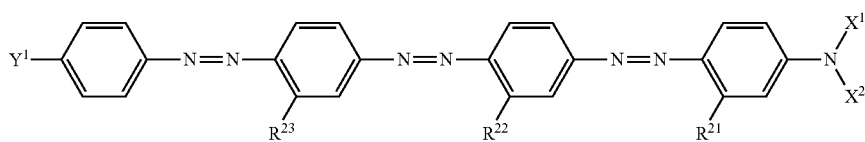
| No. | X¹ | X² | R²¹ | R²² | R²³ | Y¹ |
|---|---|---|---|---|---|---|
| A-26 | —CONH(CH₂)₂OCOC(CH₃)=CH₂ | —C₂H₅ | —H | —CH₃ | —CH₃ | 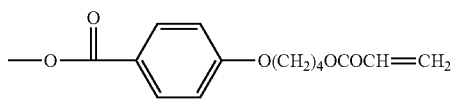 |
[Formula 12]
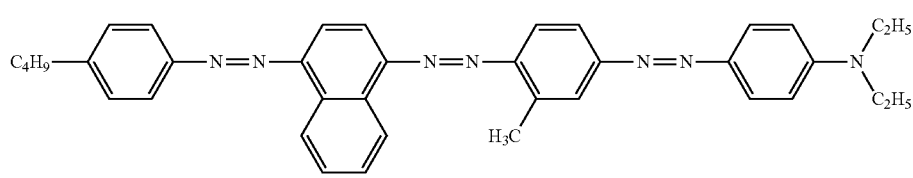
A-27
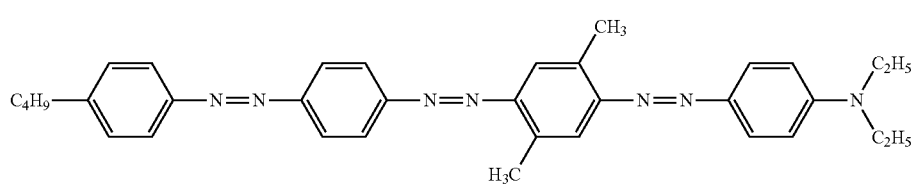
A-28
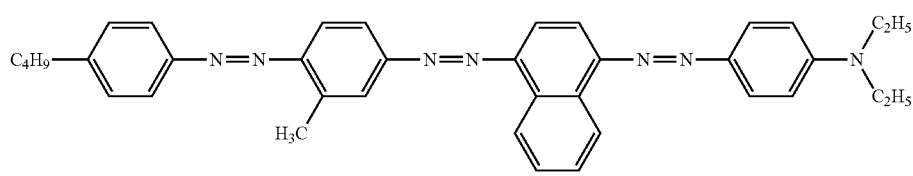
A-29
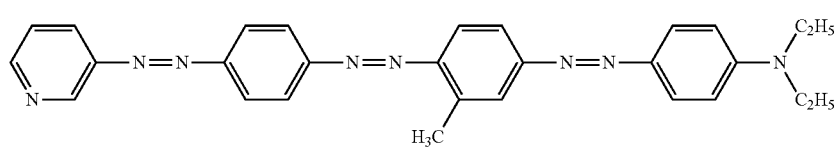
A-30
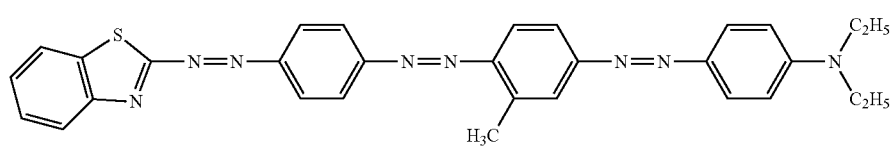
A-31
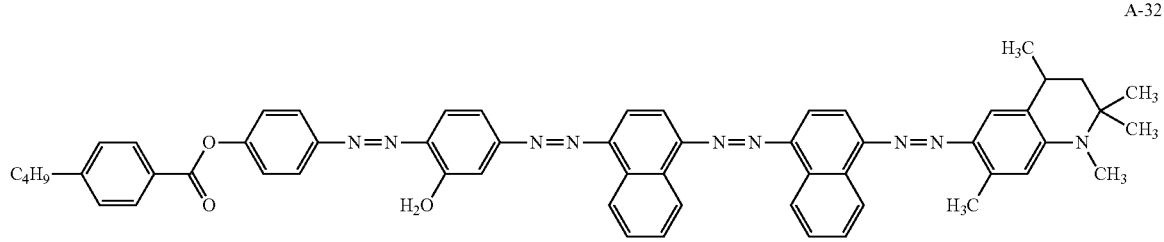
A-32

-continued
[Formula 13]
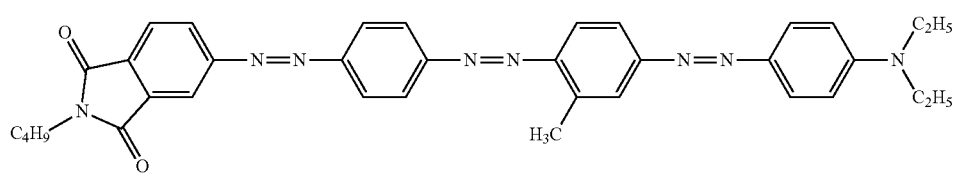
A-33
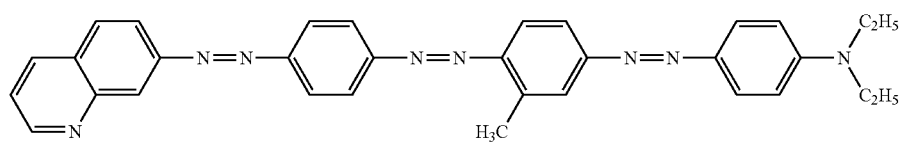
A-34
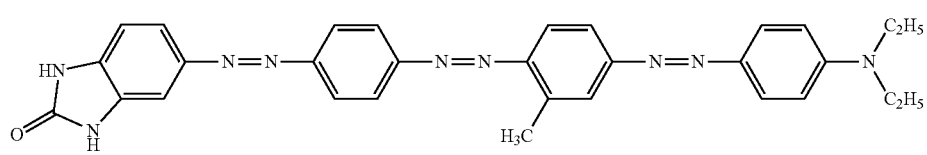
A-35
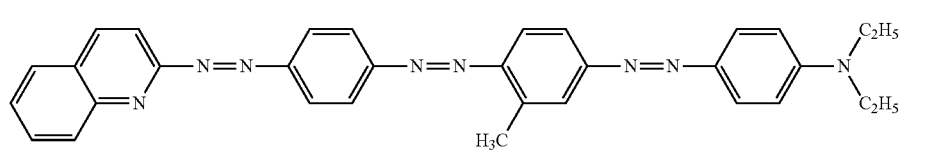
A-36
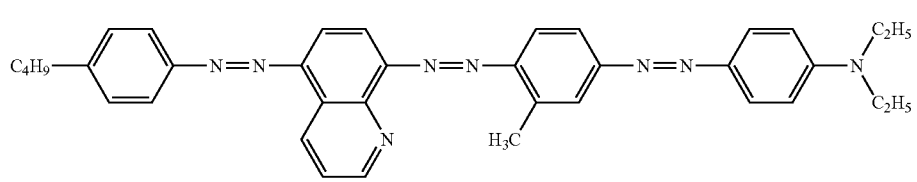
A-37
[Formula 14]
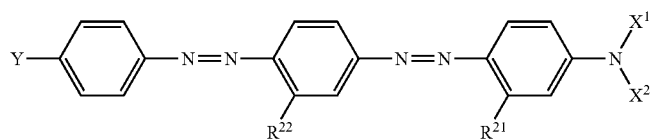
| No. | X¹ | X² | R²¹ | R²² | Y¹ |
|---|---|---|---|---|---|
| A-38 | —C₂H₅ | —C₂H₅ | —H | —CH₃ | —C₆H₄—O(CH₂)₄OCOCH=CH₂) |
| A-39 | —CONH(CH₂)₂OCOC(CH3)=CH₂ | —C₂H₅ | —H | —CH₃ | —C₆H₄—O(CH₂)₄OCOCH=CH₂) |
| A-40 | —C₂H₅ | —C₂H₅ | —H | —CH₃ | —C₄H₉ |

[Formula 15]

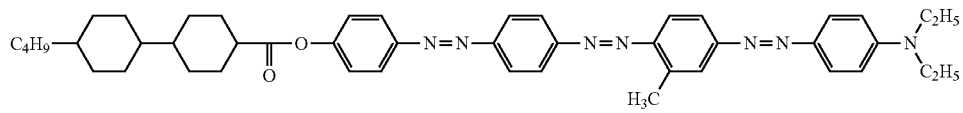

A-41

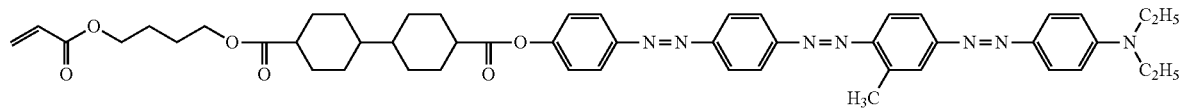

A-42

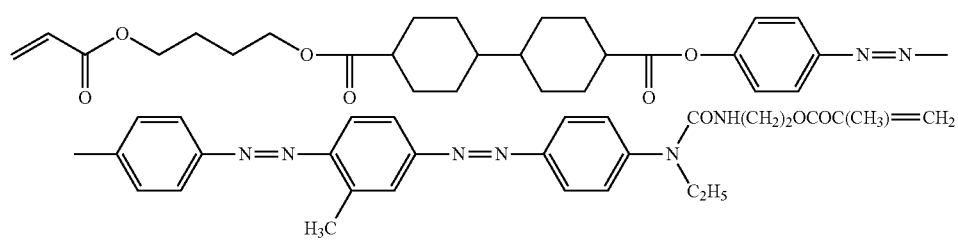

A-43

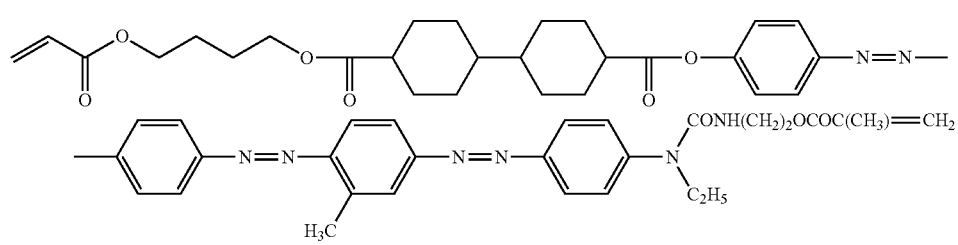

A-44

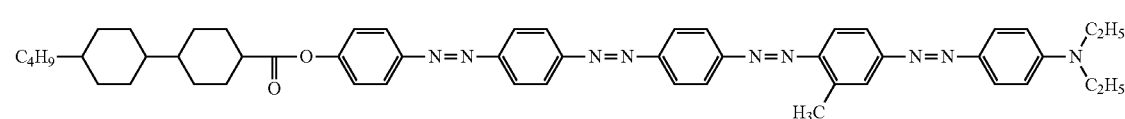

A-45

The azo dyes represented by formula (I) or (II) may be synthesized according to the method described in Journal of Materials Chemistry (1999), 9(11), 2755-2763 or the like.

The azo dye represented by the above-mentioned formula (I) and/or (II) has a flat and linear molecular configuration and has a rigid core part and a soft side chain part, as obvious from the molecular structure thereof. In addition, as having a polar amino group at the terminal of the long molecular axis thereof, the azo dye has the property of readily expressing liquid crystallinity, especially nematic liquid crystallinity. Further, since the molecular planarity of the dye is high, a strong intermolecular interaction acts in the dye, and therefore, the dye molecules readily form an aggregated state. The dye is mixed in a solvent and then applied onto the substrate, and while the solvent is evaporated away, the dye changes to a nematic state, and thereafter an aggregated form is formed to be an extremely high-order state. Accordingly, the dichroic dye composition containing the azo dye of the above-mentioned general formula (I) or (II) not only shows a high degree of light absorption in a broad visible light region through aggregation but also realizes a high-order molecular alignment state when formed into a thin film by coating or the like on a rubbed surface of an alignment film. Surprisingly, in a thin-film configuration having a thickness of at most 0.50 μm, the high-order molecular alignment state is thermally extremely stable and does not provide crystal precipitation. Accordingly, when the composition containing the azo dye of the general formula (I) or (II) is used, an in-cell polarizing layer having a high degree of polarization can be formed.

In the liquid-crystal composition for use in forming the in-cell polarizing layer, the azo dye of the general formula (I) or (II) may exist either singly or in the form of a mixture of two or more of them. Along with the azo dye, the layer may contain any other dye compound. Examples of the co-usable dye compound include azo dyes except those for use in the invention, cyanine dyes, azo metal complexes, phthalocyanine dyes, pyrylium dyes, thiopyrylium dyes, azulenium dyes, squalilium dyes, naphthoquinone dyes, triphenylmethane dyes, triallylmethane dyes, etc.

Preferably, the in-cell polarizing layer is formed by using a dichroic dye as the main ingredient thereof, more concretely, the content of the dichroic dye in the layer is preferably at least 70% by mass, more preferably at least 80% by mass, even more preferably at least 90% by mass.

The content of the azo dye of the general formula (I) or (II) is preferably at least 50% by mass of the dichroic dye, more preferably at least 70% by mass.

Any additive may be added to the liquid-crystal composition along with the dichroic dye therein. Examples of the additive include an anti-unevenness-by-wind agent, an anticissing agent, an additive for controlling the tilt angle of alignment film (tilt angle of dichroic dye in the interface of light absorbing anisotropic film/alignment film), an additive for controlling the tilt angle in the interface to air (tilt angle of dichroic dye in the interface of light absorbing anisotropic film/air), a polymerization initiator, an additive for lowering alignment temperature (plasticizer), a polymerizing monomer, a saccharide, a chemical having at least any of antifungal, antibacterial and bactericidal functions, etc.

Preferably, the thickness of the in-cell polarizing layer is from 0.02 to 0.50 more preferably from 0.04 to 0.25 p.m. Also preferably, the degree of polarization of the layer is at least 70%, more preferably at least 80%. Using the azo dye of the above-mentioned formula (I) and using the coating method as above, a layer of which the thickness falls within the above-mentioned range and of which the degree of polarization falls within the above-mentioned range can be formed.

(First Optical Film)

In the liquid-crystal display device of the invention, the absolute values of Re and Rth of the optical film to be used as the first optical film (14a in FIG. 1) are preferably smaller, and concretely, they are preferably at most 10 nm and at most 15 nm, respectively. The optical film having the characteristics of the type can be produced from a composition containing a cellulose acylate, an acrylic resin, a cyclic polyolefin or the like as the main ingredient thereof. In the following, a cellulose acylate film comprising a cellulose acylate as the main ingredient thereof, and an acrylic film comprising an acrylic resin as the main ingredient thereof are described, to which, however, the invention is not limited.

Cellulose Acylate Film:

A cellulose acylate film (a film comprising a cellulose acylate as the main ingredient thereof and optionally containing an additive such as a compound for reducing Re and Rth or the like) may be used for the first optical film.

The starting cellulose for the cellulose acylate includes cotton linter and wood pulp (hardwood pulp, softwood pulp), etc.; and any cellulose acylate obtained from any starting cellulose can be used herein. As the case may be, different starting celluloses may be mixed for use herein. The starting cellulose materials are described in detail, for example, in "Plastic Material Lecture (17), Cellulosic Resin" (written by Marusawa & Uda, published by Nikkan Kogyo Shinbun, 1970), and in Hatsumei Kyokai Disclosure Bulletin No. 2001-1745, pp. 7-8. Any cellulose material described in these can be used here with no specific limitation.

The cellulose acylate for use in the invention is, for example, one prepared from cellulose by acylating the hydroxyl group therein, in which the substituent for acylation may be any acyl group having from 2 to 22 carbon atoms. The degree of substitution of the hydroxyl group in cellulose for the cellulose acylate for use in the invention is not specifically defined. The bonding degree with acetic acid and/or a fatty acid having from 3 to 22 carbon atoms for substituting the hydroxyl group in cellulose is measured, and the degree of substitution in the cellulose acylate may be determined through computation. For the measurement, the method of ASTM D-817-91 may be employed.

In the cellulose acylate, the degree of substitution of the hydroxyl group in cellulose is not specifically defined, but preferably, the degree of acyl substitution of the hydroxyl group in cellulose is from 2.50 to 3.00, more preferably from 2.75 to 3.00, even more preferably from 2.85 to 3.00.

The acyl group having from 2 to 22 carbon atoms, which is in acetic acid and/or the fatty acid having from 3 to 22 carbon atoms and which is to substitute for the hydroxyl group in cellulose may be an aliphatic group or an aryl group, and may be a single group or a mixture of two or more different groups. For example, there may be mentioned cellulose alkylcarbonyl esters, alkenylcarbonyl esters, aromatic carbonyl esters, aromatic alkylcarbonyl esters, etc. These may be further substituted. Preferred examples of the acyl group in these include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleoyl group, a benzoyl group, a naphthylcarbonyl group, a cinnamoyl group, etc. Of those, preferred are an acetyl group, a propionyl group, a butanoyl group, a dodecanoyl group, an octadecanoyl group, a tert-butanoyl group, an oleoyl group, a benzoyl group, a naphthylcarbonyl group a cinnamoyl group, etc.; and more preferred are an acetyl group, a propionyl group, and a butanoyl group.

In case where the acyl substituent to substitute for the hydroxyl group of cellulose mentioned above comprises at least two of an acetyl group, a propionyl group and a butanoyl group, the degree of total substitution with the substituents is preferably from 2.50 to 3.00 as capable of lowering the optical anisotropy of the cellulose acylate film. More preferably, the degree of acyl substitution is from 2.60 to 3.00, even more preferably from 2.65 to 3.00.

Regarding the degree of polymerization of the cellulose acylate to be used here as the starting material, preferably, the viscosity-average degree of polymerization is from 180 to 700. More preferably, the viscosity-average degree of polymerization of cellulose acetate is from 180 to 550, even more preferably from 180 to 400, still more preferably from 180 to 350. When the degree of polymerization is not higher than a predetermined level, then the viscosity of the dope solution of cellulose acylate may be prevented from increasing too much and the film formation by casting may be effectively prevented from becoming difficult. When the degree of polymerization is not lower than a predetermined level, then the strength of the formed film may be effectively prevented from lowering. The degree of polymerization may be measured, for example, according to Uda et al's limiting viscosity method (Kazuo Uda, Hideo Saito, Sen'i Gakkaishi by the Society of Fiber Science and Technology, Japan, Vol. 18, No. 1, pp. 105-120, 1962). The method is described in detail in JP-A 9-95538.

The molecular weight distribution of the cellulose acylate preferably used here as the starting material can be evaluated through gel permeation chromatography, and the polydispersity index Mw/Mn (Mw: mass-average molecular weight, Mn: number-average molecular weight) thereof is preferably smaller, or that is, the molecular weight dispersion thereof is preferably narrower. Concretely, the value of Mw/Mn is preferably from 1.0 to 3.0, more preferably from 1.0 to 2.0, even more preferably from 1.0 to 1.6.

When the low-molecular component is removed, the mean molecular weight (degree of polymerization) may increase but the viscosity could be lower than that of ordinary cellulose acylate, and therefore the case is favorable here. The cellulose acylate in which the content of the low-molecular component is low may be prepared by removing the low-molecular component from cellulose acylate produced according to an ordinary method. The low-molecular component may be removed by washing the cellulose acylate with a suitable organic solvent. In case where the cellulose acylate in which the content of the low-molecular component is low is produced, preferably, the amount of the sulfuric acid catalyst in acetylation is controlled to be from 0.5 to 25 parts by mass relative to 100 parts by mass of cellulose. When the amount of the sulfuric acid catalyst is controlled to fall within the above range, a cellulose acylate favorable in point of the molecular weight distribution thereof (that is, having a uniform molecular weight distribution) can be produced. Preferably, the water content of the cellulose acylate for use in the invention is at most 2% by mass, more preferably at most 1% by mass, even more preferably at most 0.7% by mass. In general, cellulose acylate contains water, and it is known that the water content thereof is from 2.5 to 5% by mass. In order to control the water content of cellulose acylate to fall within the above range, the cellulose acylate must be dried, and the method for drying is not specifically defined so far as the dried cellulose acylate could have the intended water content. The starting cotton and the production method for the cellulose acylate satisfying the above-mentioned various characteristics are described in detail in Hatsumei Kyokai Disclosure Bulletin No. 2001-1745 (published on Mar. 15, 2001 by Hatsumei Kyokai) pp. 7-12.

As the starting material for the cellulose acylate film, preferably used is a single cellulose acylate or a mixture of two or more different types of cellulose acylates of which the substituent, the degree of substitution, the degree of polymerization and the molecular weight distribution each fall within the above-mentioned range.

The cellulose acylate film can be produced according to a solution casting method. To the cellulose acylate solution (dope), various additives (e.g., compound capable of lowering the optical anisotropy such as Re and Rth, wavelength dispersion characteristics-controlling agent, UV inhibitor, plasticizer, antioxidant, fine particles, optical characteristics-controlling agent, etc.) may be added in accordance with the use thereof in the production process. The additive may be added in any stage of the dope production process. The additive may be added at the end of the dope production process.

The compound capable of lowering the optical anisotropy (Re and Rth) of the cellulose acylate film, one example of the additives capable of being added to the dope, is described below.

The compound having the above-mentioned function is a compound that retards the in-plane and thickness-direction orientation of cellulose acylate in the film, and when the compound of the type is added to the dope for film formation, then the optical anisotropy of the formed film could be fully lowered, and a film of which Re and Rth are both nearly zero could be obtained. In this, "nearly zero" means that the retardation is within ±2 nm at any wavelength. The compound capable of lowering the optical anisotropy must be fully miscible with cellulose acylate, and advantageously, the compound itself does not have a rod-like structure or a plane structure. Concretely, in case where the compound has plural plane functional groups such as aromatic groups, the compound is advantageously so designed that the functional groups are not in one and the same plane but are in a non-plane structure.

As the compound capable of retarding the in-plane and thickness-direction orientation of cellulose acylate in the film to thereby lower the optical anisotropy of the film, preferred for use herein is a compound having an octanol-water partition coefficient (log P value) of from 0 to 7. When a compound having a log P value of at most 7 is used, then the compound is more miscible with cellulose acylate and the film can be effectively prevented from being cloudy and chalky. When a compound having a log P value of at least 0 is used, then the compound is highly hydrophilic and therefore can more effectively prevent the waterproofness of the cellulose acylate film from lowering. More preferably, the log P value is from 1 to 6, even more preferably from 1.5 to 5.

The octanol-water partition coefficient (log P value) can be measured according to a flask dipping method described in JIS (Japanese Industrial Standards) Z7260-107 (2000). In place of actually measuring it, the octanol-water partition coefficient (log P value) may be estimated according to a calculative chemical method or an experiential method. For the calculative method, preferred are a Crippen's fragmentation method (J. Chem. Inf. Comput. Sci., 27, 21 (1987)), a Viswanadhan's fragmentation method (J. Chem. Inf. Comput. Sci., 29, 163 (1989)), a Broto's fragmentation method (Eur. J. Med. Chem.—Chim. Theor., 19, 71 (1984)); and more preferred is a Crippen's fragmentation method (J. Chem. Inf. Comput. Sci., 27, 21 (1987)). When a compound has different log P values, depending on the measuring method or the computing method employed, then the compound may be determined as to whether or not it falls within the scope of the invention preferably according to the Crippen's fragmentation method.

The compound capable of lowering the optical anisotropy may or may not have an aromatic compound. Preferably, the compound capable of lowering the optical anisotropy has a molecular weight of from 150 to 3000, more preferably from 170 to 2000, even more preferably from 200 to 1000. Having a molecular weight that falls within the range, the compound may have a specific monomer structure or may have an oligomer structure or a polymer structure that comprises a plurality of such monomer units bonded.

The compound capable of lowering the optical anisotropy is preferably liquid at 25° C. or a solid having a melting point of from 25 to 250° C., more preferably liquid at 25° C. or a solid having a melting point of from 25 to 200° C. Also preferably, the compound capable of lowering the optical anisotropy does not vaporize in the process of dope casting and drying for cellulose acylate film formation.

The amount to be added of the compound capable of lowering the optical anisotropy is preferably from 0.01 to 30% by mass, more preferably from 1 to 25% by mass, even more preferably from 5 to 20% by mass.

The compound capable of lowering the optical anisotropy may be used either singly or as a mixture of two or more different types of such compounds combined in any desired ratio.

Regarding the content of the optical anisotropy-lowering compound in the cellulose acylate film, preferably, the mean content of the compound in the part of 10% of the overall thickness from the surface of at least one side of the film is from 80 to 99% of the mean content of the compound in the center part of the film. The amount of the optical anisotropy-lowering compound existing in the film may be determined by measuring the amount of the compound in the surface area and in the center part of the film, according to a method of infrared spectrometry as in JP-A 8-57879.

Specific examples of compound capable of lowering the optical anisotropy of cellulose acylate film are described in JP-A 2005-309382, [0081] to [0214], and are employable in the invention, to which, however, the invention is not limited.

The cellulose acylate film that satisfies the characteristics necessary for the first optical film may be produced, for example, using the starting material described in JP-A 2006-30937 and according to the production method described in the patent publication. As the first optical film, naturally usable is FUJIFILM's "ZRF80s".

Acryl Film:

As the first optical film, any acryl film containing an acrylic resin, as a main ingredient, and an additive, if necessary, may be used.

The acrylic resin, or that is, the raw material, is any resin obtained by polymerization of (meth)acrylic acid or a derivative thereof, which is a main ingredient, or any resin containing the derivative thereof; and known (meth)acrylic acid-base thermoplastic resins may be used widely. As the derivative of the (meth)acrylic acid, a methacrylate or acrylate is exemplified. Examples of the methacrylate include cyclohexyl methacrylate, t-butyl cyclohexyl methacrylate and methyl methacrylate. Examples of the acrylate include methyl acrylate, ethyl acrylate, butyl acrylate, isopropyl acrylate and 2-ethylhexyl acrylate.

Other examples of the derivative of (meth)acrylic acid include the structures represented by formula (I).

[Formula 16]

Formula (1)

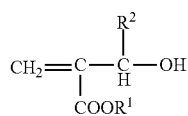

In formula (I), $R^1$ and $R^2$ each independently represent a hydrogen atom or a $C_{1-20}$ organic residue. Concretely, the organic residue is a linear, branched or cyclic $C_{1-20}$ alkyl group.

Examples of the acrylic resin include methyl(meth)acrylate, ethyl (meth)acrylate, n-propyl(meth)acrylate, n-butyl (meth)acrylate, tert-butyl (meth)acrylate, n-hexyl(meth) acrylate, 2-chloroethyl(meth)acrylate, 2-hydroxyethyl (meth)acrylate, 3-hydroxypropyl(meth)acrylate, 2,3,4,5,6-pentahydroxyethoxy (meth)acrylate, and 2,3,4,5-tetrahydroxypenthyl(meth)acrylate; and, in terms of the thermal stability, methyl(meth)acrylate (referred to as "MMA") is preferable. The acrylic resin may be a homopolymer of one acrylic resin, may be a copolymer of two or more acrylic resins, or may be a copolymer of at least one acrylic resin and other resin; however, in terms of elevating the glass transition temperature (referred to as "Tg"), copolymers of an acrylic resin and other resin are preferable.

Examples of the monomer other than the acrylic resin which can be copolymerized with the acrylic resin include aromatic vinyl compounds such as styrene, styrenes with an alkyl-substituted core which include o-methyl styrene, p-methyl styrene, 2,4-dimethyl styrene, o-ethyl styrene, p-ethyl styrene and p-tert-butyl styrene, and α-alkyl-substituted styrenes which include α-methyl styrene, and α-methyl-p-methyl styrene; vinyl cyanides such as acryl nitrile and methacryl nitrile; maleimides such as N-phenyl maleimide and N-cyclohexyl maleimide; unsaturated carboxylic acid anhydrides such as lactone ring unit, glutaric acid anhydride unit and maleic acid anhydride; unsaturated acids such as maleic acid, and glutarimide unit. Among these, in terms of improving the thermal durability, N-substituted maleimide such as N-phenyl maleimide, N-cyclohexyl maleimide and N-methyl maleimide, lactone ring unit, glutaric acid anhydride unit, maleic acid anhydride unit and glutarimide unit are preferable; and in terms of elevating Tg, lactone ring unit, maleic acid anhydride and glutaric acid anhydride unit are preferable.

And the acrylic resin may contain any copolymerized unit of another monomer unit which can be copolymerized as far as the thermal durability is not lowered. Examples of another monomer which can be copolymerized include aromatic vinyl series monomers such as styrene, α-methyl styrene, o-methyl styrene, p-methyl styrene, o-ethyl styrene, p-ethyl styrene and p-tert-butyl styrene, vinyl cyanide series monomers such as acrylonitrile, methacrylonitrile and ethacrylonitrile, allyl glycidyl ether, styrene-p-glycidyl ether, p-glycidyl styrene, itaconic acid anhydride, N-methyl maleimide, N-ethyl maleimide, N-cyclohexyl maleimide, N-phenyl maleimide, acrylamide, methacrylamide, N-methyl acrylamide, butoxymethyl acrylamide, N-propyl methacrylamide, aminoethyl acrylate, propylaminomethyl acrylate, dimethylaminoethyl methacrylate, ethylaminopropyl methacrylate, phenylaminoethyl methacrylate, cyclohexylaminoethyl methacrylate, N-vinyl diethylamine, N-acetyl vinyl amine, allylamine, methallylamine, N-methyl allylamine, p-amino styrene, 2-isopropenyl-oxazoline, 2-vinyl-oxazoline, 2-acryloyl-oxazoline, 2-styrir-oxazoline, nitrile series monomers such as acrylonitrile, vinyl esters such as vinyl acetate and glutarimide units The acrylic resin is preferably an acrylic resin containing a lactone ring unit, an acrylic resin containing a maleic acid anhydride unit or an acrylic resin containing a glutar acid anhydride; or the acrylic resin is more preferably an acrylic resin containing a lactone ring unit or an acrylic resin containing a maleic acid anhydride unit.

The acrylic resin preferably contains an MMA unit (monomer) in an amount of equal to or more than 30% by mole, or more preferably in an amount of from 30 to 80% by mole, with respect to the total amount of all of the monomers constituting the acrylic resin. And, the acrylic resin more preferably contains at least one lactone ring, maleic acid anhydride or glutaric acid anhydride unit along with the MMA. The acrylic resin preferably contains the lactone ring, maleic acid anhydride or glutaric acid anhydride unit in an amount of from 5% by mole to 60% by mole, or more preferably in an amount of from 10% by mole to 50% by mole, with respect to the total amount of all of the monomers constituting the acrylic resin.

The grass transition temperature (Tg) of the acrylic resin is preferably is from 105 degrees Celsius to 170 degrees Celsius, more preferably from 110 degrees Celsius to 160 degrees Celsius, or even more preferably from 115 degrees Celsius to 150 degrees Celsius. The melt viscosity thereof is preferably from 500 Pa·s to 10000 Pa·s, more preferably from 800 Pa·s to 7000 Pa·s, or even more preferably from 1000 Pa·s to 5000 Pa·s, when being applied with 1% of distortion by 1 Hz at 230 degrees Celsius.

The weight-averaged molecular weight of the acrylic resin is preferably from 1,000 to 2,000,000, more preferably from 5,000 to 1,000,000, even more preferably from 10,000 to 500,000, or especially preferably from 50,000 to 500,000.

The acryl film may contain at least one additive along with the acrylic resin. Examples of such an additive include a plasticizer, a stabilizer, a matting agent, an ultraviolet absorber, an infrared absorber, and retardation controlling agent.

The acryl film can be prepared according to a melt-extrusion method. More specifically, the acryl film may be prepared according to a method containing a step of preparing a melt acrylic resin, a step of extruding the melt resin from a die, and a step of solidifying the melt resin, which was extruded from the die, on a casting roll so as to give a film.

(Polarizing Plate)

In the invention, the first and second optical films may be protective films for the first and second polarizing elements, respectively. For example, the polarizing element and the optical film may be stuck together to form a polarizing plate, which may be used in the liquid-crystal display device of the invention. As the polarizing element, herein employable is an ordinary linear polarizing film. A stretched polyvinyl alcohol film is dipped in a solution of iodine or a dichroic dye in a bath, whereby the iodine or the dichroic dye is penetrated into the binder in the film to produce a linear polarizing film, and the thus-produced film may be used here. Preferably, a protective film is additionally stuck to the other surface of the polarizing element opposite to the surface thereof to which the first or second optical film has been stuck. Preferably, the protective film to be stuck to the outer side is further coated with a antifouling or abrasion-resistant antireflection film on the outermost surface thereof. The antireflection film may be any known one.

EXAMPLES

The invention is described more concretely with reference to the following Examples. In the following Examples, the material and the reagent used, their amount and ratio, the details of the treatment and others may be suitably modified or changed not overstepping the spirit and the scope of the invention. Accordingly, the invention should not be limitatively interpreted by the Examples mentioned below.

1. Production of VA-Mode Liquid-Crystal Cell (1) Production of Color Filter:

Transer color filter (by FUJIFILM) was formed on the surface of a transparent glass substrate according to the method described in JP-A 10-221518.

The surface irregularity of the Transer color filter was at most 0.2 μm. The thicknesses of the blue, green and red layers of the color filter was 3.5 μm. Rth of the color filter was 1 nm, and the Re thereof was 0 nm.

(2) Formation Polarizing Layer:

0.5 parts by mass of the following azo dye was added to 98 parts by mass of chloroform, stirred, dissolved and filtered to prepare a dichroic dye composition coating liquid. Next, an alignment film was formed by coating on the color filter layer and rubbed, and then the coating liquid was applied onto the alignment film, and thereafter this was spontaneously dried at room temperature to remove chloroform, thereby forming a polarizing layer. Polyimide was used as the alignment film.

The absorbance of the thus-formed polarizing layer for the polarized light having a vibration plane in the absorption axis direction in the dye film plane (Az), and the absorbance thereof for the polarized light having a vibration plane in the polarizing axis direction in the dye film plane (Ay) were measured, and the degree of polarization was computed, and was 90.4%. The film thickness was 0.08 μm, and the degree of alignment order was 0.95. An overcoat layer and a transparent electrode layer were formed on this, thereby producing a color filter-fitted substrate for use herein.

(3) Production of VA-Mode Liquid-Crystal Cell:

The color filter-fitted substrate produced here as a substrate for liquid-crystal cell, and an ITO transparent electrode-fitted glass substrate were used. The cell gap was 3.6 μm. A liquid-crystal material ("MLC6608" by Merck) having a negative dielectric anisotropy was dropwise injected into the space between the substrates and then sealed up, thereby forming a liquid-crystal layer between the substrates. The retardation of the liquid-crystal layer (that is, the product of the thickness d (μm) of the liquid-crystal layer and the refractive anisotropy Δn thereof, Δn·d) was 310 nm. An alignment film ("JALS-2021-R1" by JSR) was formed on the substrate by coating, fired and rubbed, whereby the liquid crystal of the liquid-crystal material was vertically aligned. In that manner, a VA-mode liquid-crystal cell was produced.

2. Production of IPS-Mode Liquid-Crystal Cell

A comb-shaped electrode was disposed on one glass sheet in such a manner that the distance between the neighboring electrode parts could be 20 μM, and a polyimide film was disposed thereon as an alignment film, and rubbed. A polyimide film was disposed on the surface of the color filter-fitted substrate produced in the above, and rubbed, thereby forming an alignment film. These two glass substrates were stuck together in such a manner that their alignment films could face each other, that the distance (gap, d) between the substrates could be 3.9 μm and that the rubbing directions of the two glass substrates could be parallel to each other, and then a nematic liquid-crystal composition having a refractive anisotropy (Δn) of 0.0769 and a positive dielectric anisotropy (Δ∈) of 4.5 was introduced between then and sealed up. The value of d·Δn of the liquid-crystal layer was 300 nm.

3. Preparation of Transparent Film 1

A commercial cellulose acetate film (Fujitac TD80UF, by FUJIFILM—hereinafter referred to as "TAC Film") was used as a transparent film 1. Its optical characteristics were as follows:

Azo Dye A-10:

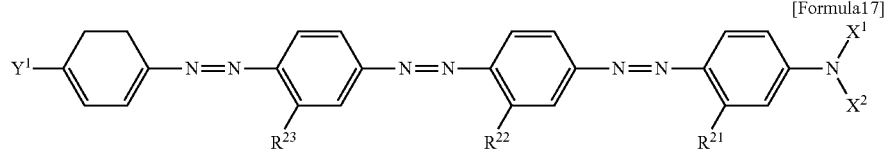

[Formula17]

| No. | $X^1$ | $X^2$ | $R^{21}$ | $R^{22}$ | $R^{23}$ | $Y^1$ |
|---|---|---|---|---|---|---|
| A-10 | $C_2H_5$ | —$C_2H_5$ | —H | —$CH_3$ | —H | —$C_4H_9$ |

Re(550)=1 nm,
Rth(550)=38 nm,
|Re(400)−Re(700)|=0.8 nm, and
|Rth(400)−Rth(700)|=20 nm.

4. Formation of Transparent Film 2

(1) Preparation of Cellulose Acetate Solution:

The following ingredients were put into a mixing tank, stirred and dissolved to prepare a cellulose acetate solution D.

Formulation of Cellulose Acetate Solution D:

| Cellulose acetate having a degree of acetylation of 2.86 | 100.0 mas. pts. |
|---|---|
| Methylene chloride (first solvent) | 402.0 mas. pts. |
| Methanol (second solvent) | 60.0 mas. pts. |

(2) Preparation of Mat Agent Solution:

20 parts by mass of silica particles having a mean particle size of 16 nm (AEROSIL R972, by Nippon Aerosil) and 80 parts by mass of methanol were well stirred and mixed for 30 minutes to prepare a silica particle dispersion. This dispersion was put into a disperser along with the following composition thereinto, stirred for 30 minutes or more and dissolved to prepared a mat agent solution.

Formulation of Mat Agent Solution:

| Silica particle dispersion having a mean particle size of 16 nm | 10.0 mas. pts. |
|---|---|
| Methylene chloride (first solvent) | 76.3 mas. pts. |
| Methanol (second solvent) | 3.4 mas. pts. |
| Cellulose acetate solution D | 10.3 mas. pts. |

(3) Preparation of Additive Solution:

The following ingredients were put into a mixing tank, stirred under heating and dissolved to prepare a cellulose acetate solution. As the optical anisotropy-lowering compound and the wavelength dispersion characteristics-controlling agent, the following compounds were used.

Formulation of Additive Solution:

| Optical anisotropy-lowering compound (Compound A-19) mentioned below | 49.3 mas. pts. |
|---|---|
| Wavelength dispersion characteristics-controlling agent (Compound UV-102) mentioned below | 7.6 mas. pts. |
| Methylene chloride (first solvent) | 58.4 mas. pts. |
| Methanol (second solvent) | 8.7 mas. pts. |
| Cellulose acetate solution D | 12.8 mas. pts. |

[Formula 18]

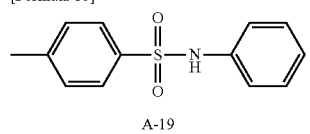

A-19

UV-102

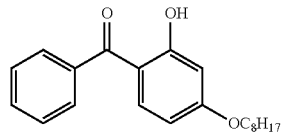

(4) Formation of Transparent Film 2:

94.6 parts by mass of the above-mentioned cellulose acetate solution D, 1.3 parts by mass of the mat agent solution, and 4.1 parts by mass of the additive solution were separately filtered and then mixed, and the mixture was cast using a band caster. In the above-mentioned composition, the ratio by mass of the optical anisotropy-lowering compound and that of the wavelength dispersion characteristics-controlling agent to the cellulose acetate were 12% and 1.8%, respectively. When the residual solvent amount therein was 30%, the film was peeled from the band, and dried at 140° C. for 40 minutes to give a cellulose acetate film. Thus formed, the cellulose acetate film had a residual solvent amount of 0.2%, and the thickness thereof was 40 μm. This was used here as a transparent film 2. Re(550) of the transparent film 2 was 0.3 nm, and Rth(550) thereof was 3.2 nm.

5. Formation of Transparent Film 3:

Preparation of Maleic Anhydride Unit-Containing Acrylic Acid Resin MA-2:

According to the "heat-resistant acrylic resin" described in JP-A 2007-113109, [0049], a resin was produced comprising 10 mol % of maleic anhydride, 16 mol % of styrene and 74 mol % of methyl methacrylate. Its Tg was 112° C.

The prepared acrylic resin was dried in a vacuum drier at 90° C. to have a water content of at most 0.03%, and then 0.3% by weight of a stabilizer (Irganox 1010, by Ciba Geigy) was added thereto. In a nitrogen atmosphere at 230° C., this was extruded into water to give strands therein, using a vented double-screw kneading extruder, and then cut into pellets having a diameter of 3 mm and a length of 5 mm.

The pellets were dried in a vacuum drier at 90° C. to have a water content of at most 0.03%, and then melt-kneaded at the temperature shown in the following Table, using a single-screw kneading extruder. Next, a 300-mesh screen filter was set between the extruder and the gear pump. Next, after led to pass through an air pump, and the melt was further led to pass through a leaf disc filter having a filtration accuracy of 7 μm, and then extruded out through the die, and cast.

Subsequently, the melt (resin melt) was extruded out onto a triple casting roll. In this, a touch roll was kept in contact with the most upstream-side casting roll (chill roll) under a predetermined surface pressure. The touch roll used here is one described in Example 1 in JP-A 11-235747 (the roll is described in the publication as a double-pressure roll, however, the thin-walled metal jacket thickness of the roll was changed to 2 mm here). At Tg−5° C., the touch roll was kept in contact under the touch pressure shown in the following Table. The temperature profile of the triple casting roll including the chill roll was so controlled that the touch roll and the most upstream-side casting roll (first roll) kept in contact with the touch roll could have a predetermined temperature difference (casting roll temperature−touch roll temperature). Further, the temperature of the next casting roll (second roll) was (temperature of the first roll−5° C.); and the temperature of the casting roll (third roll) after the above-mentioned next casting roll was (temperature of the first roll−10° C.).

After this, just before wound up, the film was trimmed on both edges thereof (each 5 cm of the overall width), and then knurled also on both edges thereof at a width of 10 mm and a height of 20 μm each. The width of the film was 1.5 m, and the film was wound up for 3,000 m at a film formation speed of 30 m/min. Thus formed, the unstretched film had a thickness of 60 μm.

A touch roll was kept in contact with the most upstream-side casting roll under a predetermine surface pressure.

Concretely, in the above process, the screw temperature difference (outlet port temperature−inlet port temperature) was 30° C.; the extrusion rate was 200 kg/hr; the differential pressure before and after the gear pump (computed by subtracting the back-side pressure from the front-side pressure)

was −3 MPa; and the temperature difference between the casting roll and the touch roll was −5° C. The misalignment between the melt landing point and the touch roll/casting roll intermediate point was at the position of −3 mm toward the casting roll. Regarding the other conditions, the touch pressure of the touch roll was 0.1 MPa, the film width fluctuation in film formation was 6%, and the mean value of the film width was 2.5 m.

As in the above, an acrylic film was produced. The acrylic film was used here as a transparent film 3. The transparent film 3 had:
Re=2 nm,
Rth=−2 nm,
|Re(400)−Re(700)|=0.11 nm, and
|Rth(400)−Rth(700)|=1.1 nm.

6. Formation of Transparent Film 4

(1) Preparation of Polymer Solution:

Cellulose Acylate A:

A cellulose acetate powder having a degree of substitution of 2.94 was used here. The viscosity-average degree of polymerization of the cellulose acylate A was 300, and the degree of substitution with acetyl group at the 6-position thereof was 0.94.

Solvent:

The following solvent A was used. The water content of the solvent A was at most 0.2% by mass.

Solvent A: Dichloromethane/methanol/butanol=83/15/2 (by mass)

Additive:

Silicon dioxide fine particles (particle size, 20 nm; Mohs hardness, about 7) (0.08 parts by mass)

The above-mentioned solvent and additive were put into a 400-liter stainless-steel dissolution tank equipped with a stirring blade and with cooling water circulating around the outer periphery thereof, and with dispersing them by stirring, the above-mentioned cellulose acylate was gradually added thereto. After the addition, this was stirred at room temperature for 2 hours, and then swollen for 3 hours, and thereafter again stirred to prepare a cellulose acylate solution.

For stirring the system, used were a dissolver-type eccentric stirring shaft running at a peripheral speed of 15 m/sec (shear stress, $5 \times 10^4$ kgf/m/sec$^2$ [$4.9 \times 10^5$ N/m/sec$^2$]) and a stirring shaft having an anchor blade as the central axis thereof and running at a peripheral speed of 1 m/sec (shear stress, $1 \times 10^4$ kgf/m/sec$^2$ [$9.8 \times 10^4$ N/m/sec$^2$]). For swelling, the high-speed stirring shaft was stopped, and the peripheral speed of the anchor blade-having stirring shaft was changed to 0.5 m/sec.

The swollen solution was heated up to 50° C. from the tank to the jacketed pipe, then further heated up to 90° C. under a pressure of 2 MPa, and was thus completely dissolved. The heating time was 15 minutes. In the process, the filter, the housing and the pipe exposed to high temperatures were all made of a hastelloy alloy having excellent corrosion resistance, and were all surrounded by a jacket for circulating therethrough a heat carrier for thermal insulation and heating.

Next, this was cooled to 36° C. to give a cellulose acylate solution.

Thus obtained, the cellulose acylate solution was filtered through a paper filter having an absolute filtration accuracy of 10 μm (#63, by Toyo Roshi Kaisha), and further filtered through a metal-sintered filter having an absolute filtration accuracy of 2.5 μm (FH025, by Pall) to give a polymer solution.

(2) Formation of Transparent Film 4:

The cellulose acylate solution was heated at 30° C., and cast onto a mirrored stainless support having a band length of 60 m and set at 15° C., through a casting Giesser (described in JP-A 11-314233). The casting speed was 50 m/min, and the coating width was 200 cm. The space temperature of the entire casting zone was set at 15° C. At 50 cm before the end point of the casting zone, the cellulose acylate film that had been cast and rotated thereon was peeled from the band, and aerated with drying air at 45° C. Next, this was dried at 110° C. for 5 minutes and at 140° C. for 10 minutes, thereby giving a cellulose acylate film having a thickness of 125 μm.

Thus formed, the cellulose acylate film was monoaxially stretched in the machine direction using a roll stretcher. As the rolls of the roll stretcher, used were induction-heated jacket rolls each having a mirror-finished surface. The temperature of each roll was made to be individually controlled. The stretching zone was covered with a casing so as to have a predetermined temperature. The rolls before the stretching zone were so designed that the traveling film could be gradually heated up to the stretching temperature of 160° C. The draw ratio in stretching was 40%, which was controlled by controlling the peripheral speed of the nip rolls. The aspect ratio (distance between nip rolls/base inlet port width) was controlled to be 0.5; and the stretching speed was 10%/min relative to the stretch distance.

The pre-stretching draw ratio of the film was determined according to the following formula, for which gauge lines were marked on the film at predetermined intervals in the direction perpendicular to the film traveling direction, and the distance between the lines was measured before and after the heat treatment.

Film Pre-Stretching Draw Ratio (%)=100×(distance between gauge lines after heat treatment−distance between gauge lines before heat treatment)/distance between gauge lines before heat treatment Both sides of the thus-obtained film were clipped with a tenter, and then led to pass through a heating zone at 260° C. The dimensional change in the cross direction was controlled by changing the tenter scaling ratio. The dimensional change in the cross direction, as computed based on the temperature in the heating zone and according to the above-mentioned method, was −12%.

Both sides of the obtained film were clipped with a tenter, and then stretched in the direction perpendicular to the film-traveling direction in the heating zone. The draw ration in the heating zone at 260° C. and by the tenter was 2%. In case where the film was processed in a heat treatment step, the film was clipped with a tenter at the heat treatment zone inlet port, and then not unclipped, this was directly conveyed into the re-stretching zone.

The optical characteristics of the produced transparent film 4 were Re(550)=287 nm and Rth(550)=−8 nm.

7. Formation of Transparent Film 5

(1) Production of Cyclo-Olefinic Resin (Resin A1):

250 parts of 8-methyl-8-methoxycarbonyltetracyclo[4.4.0.1$^{2,5}$.1$^{7,10}$]-3-dodecene (specific monomer), 18 parts of 1-hexene (molecular weight-controlling agent) and 750 parts of toluene (solvent for ring-opening polymerization) were put into a nitrogen-purged reactor, and the solution was heated at 60° C. Next, 0.62 parts of a toluene solution of a polymerization catalyst, triethylaluminium (1.5 mol/l), and 3.7 parts of a toluene solution of tungsten hexachloride modified with t-butanol and methanol (t-butanol/methanol/tungsten=0.35 mol/0.3 mol/1 mol) (concentration, 0.05 mol/l) were added to the solution in the reactor, and the system was heated with stirring at 80° C. for 3 hours for ring-opening polymerization to give a solution of ring-opened polymer. The polymerization conversion in this polymerization was 97%. Thus obtained, the inherent viscosity (ηinh) of the ring-opened polymer was measured in chloroform at 30° C., and was 0.75 dl/g.

4,000 parts of the thus-obtained, ring-opened polymer solution was put into an autoclave, and 0.48 parts of RuHCl(CO)[P(C$_6$H$_5$)$_3$]$_3$ was added to the ring-opened polymer solution, and heated with stirring for 3 hours for hydrogenation under the condition of a hydrogen gas pressure of 100 kg/cm$^2$ and a reaction temperature of 165° C.

The obtained reaction solution (hydrogenated polymer solution) was cooled, and then the hydrogen gas was released. The reaction solution was poured into a large quantity of methanol, and the coagulated matter was separated, collected and dried to give a hydrogenated polymer (hereinafter referred to as "Resin A1").

(2) Formation of Resin Film (a1-1):

The resin A1 was dissolved in toluene to prepare a 30% solution (the solution viscosity at room temperature was 30,000 mPa·s), and an antioxidant, pentaerythrityl tetrakis[3-(3,5-di-t-butyl-4-hydroxyphenyl)propionate] was added thereto in an amount of 0.1 parts by mass relative to 100 parts by mass of the polymer. This was filtered through a metal fibers-sintered filter having a pore size of 5 μm (by Nihon Pall), with controlling the flow rate of the solution so that the differential pressure could be within 0.4 MPa.

The obtained polymer solution was applied onto a substrate, PET film (Toray's Lumirror U94) having a thickness of 100 μM, of which the surface had been surface-treated for hydrophilication with an acrylic acid-type compound (for easy adhesion treatment), using Inoue Metal Industry's INVEX Labocoater installed in a class-1000 clean room, in such a manner that the film thickness after drying could be 200 μm, and this was primary-dried at 50° C. and then secondary-dried at 90° C. The film was peeled from the PET film to be a resin film (a1-1). The residual solvent amount in the thus-obtained film was 0.5%, and the whole light transmittance thereof was 93%.

(3) Formation of Transparent Film 5:

A polyester film having a shrinkage at the stretching temperature, 180° C. (Tg+10° C.) of 30% was stuck to the surface of the resin film (a1-1) in such a manner that the shrinking direction thereof could be perpendicular to the stretching direction thereof, and stretched by 2.0 times at a stretching speed of 300%/min. Next, this was cooled in an atmosphere at 150° C. (Tg−20° C.) while kept as it was for 1 minute, then further cooled to room temperature, and taken out, and the polyester film was peeled away to give a transparent film 5.

The optical characteristics of the thus-formed transparent film 5 were Re(550)=125 nm and Rth(550)=60 nm.

8. Formation of Transparent Film 6:

The surface of the transparent film 5 was saponified, and then an alignment coating liquid having the following composition was continuously applied thereonto, using a #14 wire bar. This was dried with hot air at 60° C. for 60 seconds and then with hot air at 100° C. for 120 seconds thereby forming an alignment film thereon.

| Composition of Alignment Film Coating Liquid | |
|---|---|
| Modified polyvinyl alcohol mentioned below | 10 mas. pts. |
| Water | 371 mas. pts. |
| Methanol | 119 mas. pts. |
| Glutaraldehyde | 0.5 mas. pts. |

[Formula 19]
Modified Polyvinyl Alcohol:

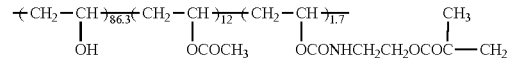

A coating liquid having the following composition and containing a rod-shaped liquid-crystal compound was continuously applied onto the alignment film formed in the above, using a #46 wire bar. The film traveling speed was 20 m/min. The solvent was evaporated away while the film was continuously heated from room temperature up to 90° C., and thereafter the film was heated in a drying zone at 90° C. for 90 seconds to thereby align the rod-shaped liquid-crystal compound. Subsequently, the film temperature was kept at 60° C., and the alignment of the liquid-crystal compound was fixed through irradiation with UV to thereby from an optically anisotropic layer. Subsequently, the surface of the cellulose acetate film on the side opposite to the side thereof, on which the optically anisotropic layer B1 had been formed, was continuously saponified, thereby producing a transparent film 6.

| Formulation of Rod-Shaped Liquid-Crystal Compound-Containing Coating Liquid (S1) | |
|---|---|
| Rod-shaped liquid-crystal compound (I) mentioned below | 100 mas. pts. |
| Photopolymerization initiator (Irgacure 907, by Ciba Geigy) | 3 mas. pts. |
| Sensitizer (Kayacure DETX, by Nippon Kayaku) | 1 mas. pt. |
| Fluoropolymer mentioned below | 0.4 mas. pts. |
| Pyridinium salt mentioned below | 1 mas. pt. |
| Methyl ethyl ketone | 172 mas. pts. |

Rod-Shaped Liquid-Crystal Compound (I):
[Formula 20]

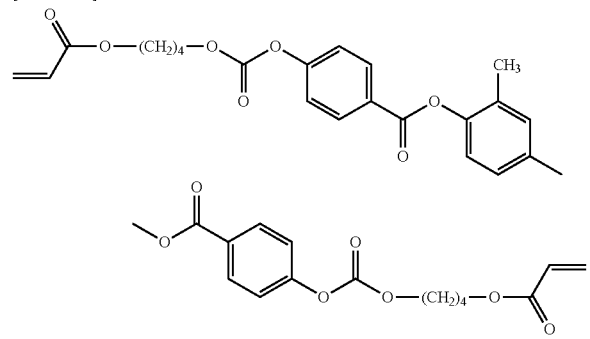

[Formula 21]
Fluoropolymer:

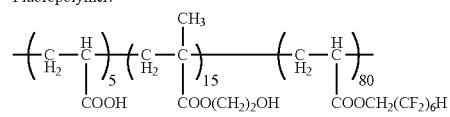

[Formula 22]
Pyridinium Salt:

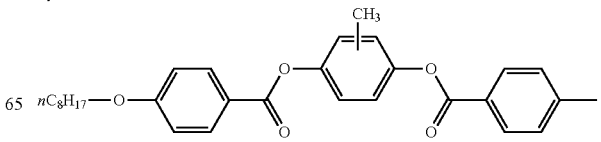

Formulation of Rod-Shaped Liquid-Crystal Compound-Containing Coating Liquid (S1)

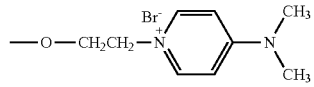

The rod-shaped liquid-crystal compound-containing optically-anisotropic layer alone was peeled from the thus-formed transparent film 6, and analyzed for the optical characteristics thereof. Re(0) of the optically anisotropic layer alone, as measured at a wavelength of 550 nm, was 0 nm. On the other hand, Rth thereof was −130 nm. In the optically anisotropic layer of the transparent film 6 formed here, the rod-shaped liquid-crystal molecules were aligned substantially vertically to the film surface.

The whole of the transparent film 6 had Re(550) of 125 nm and Rth(550) of −70 nm. However, since the transparent film was a two-layered film, it must be understood that the values thereof are not equivalent to the physical values of Re and Rth defined for a single-layer biaxial film.

9. Formation of Transparent Film 7
(1) Preparation of Cellulose Triacetate:

Cellulose was acylated at 40° C., using sulfuric acid (7.8 parts by mass relative to 100 parts by mass of cellulose) added thereto as a catalyst and using, also added thereto, a carboxylic acid to be the starting material for the acyl substituent, thereby producing CTA (cellulose triacetate having a total degree of substitution of 2.81 (cellulose ester derivative in which the acyl groups are all acetate groups)).

(2) Preparation of CTA Solution:

The following ingredients were put into a mixing tank, dissolved by stirring, then heated at 90° C. for about 10 minutes, and thereafter filtered through a paper filter having a mean pore size of 34 μm and a sintered metal filter having a mean pore size of 10 μm.

| CTA Solution | |
| --- | --- |
| CTA | 100.0 mas. pts. |
| Triphenyl phosphate (TPP) | 8.0 mas. pts. |
| Biphenyldiphenyl phosphate (BDP) | 4.0 mas. pts. |
| Methylene chloride | 403.0 mas. pts. |
| Methanol | 60.2 mas. pts. |

(3) Preparation of Mat Agent Dispersion:

Next, the following composition containing the CTA solution prepared in the above was put into a disperser to prepare a mat agent dispersion.

| Mat Agent Dispersion | |
| --- | --- |
| Silica particles having a mean particle size of 16 nm (Aerosil R972, by Nippon Aerosil) | 2.0 mas. pts. |
| Methylene chloride | 72.4 mas. pts. |
| Methanol | 10.8 mas. pts. |
| Cellulose acylate solution | 10.3 mas. pts. |

(4) Preparation of Additive Solution:

The following composition containing the CTA solution prepared in the above was put into a mixing tank, stirred under heat and dissolved, thereby preparing an additive solution.

| Additive Solution | |
| --- | --- |
| UV1 and UV2 | 20.0 mas. pts. |
| Methylene chloride | 58.3 mas. pts. |
| Methanol | 8.7 mas. pts. |
| Cellulose acylate solution | 12.8 mas. pts. |

UV1: 2-(2'-hydroxy-3',5'-di-tert-butylphenyl)benzotriazole
UV2: 2-(2'-hydroxy-3',5'-di-amylphenyl)-5-chlorobenzotriazole 100 parts by mass of the cellulose acylate solution, 1.35 parts by mass of the mat agent dispersion, and the additive solution in such an amount that the ratio of UV1 to be in the cellulose acylate film could be 0.7 and that of UV2 could be 0.3 were mixed to prepare a dope for film formation. The ratio of the additives is expressed as the part by mass thereof relative to 100 parts by mass of the cellulose acylate.

The dope was cast, using a band caster. While having the residual solvent amount shown in the following Table, the film peeled away from the band was stretched in the machine direction to the draw ratio shown in Tables 1 and 2 within the zone from the peeling point to the subsequent tenter, and then, using the tenter, this was stretched in the cross direction to the draw ratio shown in Tables 1 and 2, and then, immediately after the stretching, this was shrunk (relaxed) in the cross direction to the ratio shown in the following Table, and thereafter removed from the tenter to give a CTA film. The residual solvent amount in the film just peeled from the tenter was as in the following Table. Both sides of the film were trimmed away before the winding zone so that the film width could be 2000 mm, and the film was wound up as a roll film having a length of 4000 m. The draw ratio in stretching is shown in the following Table.

TABLE 1

| Cellulose Film | type of cellulose | CTA |
| --- | --- | --- |
| | total degree of substitution | 2.81 |
| | degrees of A substitution | 2.81 |
| | degree of B substitution | 0 |
| | ratio of 6-position substitution | 0.320 |
| | degree of 6-position substitution | 0.9 |
| | substituent A | Ac |
| | substituent B | — |
| Additive | type of additive | retardation enhancer (1) |
| | added amount [part by mass, relative to 100 parts by mass of cellulose] | 13 |
| Plasticizer | type of plasticizer | TPP/BDP |
| | amount of plasticizer [part by mass, relative to 100 parts by mass of cellulose] | 7.8/3.9 |
| Stretching Condition | draw ratio in machine-direction stretching [%] | 3 |
| | draw ratio in cross-direction stretching [%] | 32 |
| | relaxation ratio [%] | 7 |
| | stretching speed [%/min] | 35 |
| | film surface temperature [° C.] | 120 |
| | residual solvent amount just before winding [%] | 55 |
| | residual solvent amount just after stretching [%] | 12 |

The abbreviations of the additive and the plasticizer in the Table are as mentioned below.

TPP: triphenyl phosphate
BDP: biphenyldiphenyl phosphate

[Formula 23]

Retardation Enhancer (1)

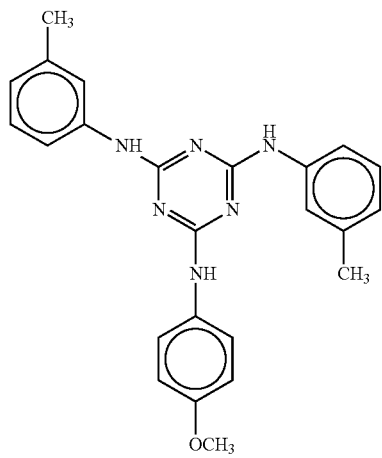

The produced CTA film was used here as a film 7. The thickness of the film 7 was 85 and Re thereof at a wavelength of 550 nm was 55 nm and Rth thereof was 200 nm.

10. Formation of Transparent Film 8

According to exactly the same method as that for the transparent film 7 but changing the coating amount of the dope, a CTA film was formed having a thickness of 105 μm. The CTA film was used here as a transparent film 8. Re of the formed film 8 at a wavelength of 550 nm was 60 nm and Rth thereof was 250 nm.

11. Formation of Polarizing Plates A to G (1) Formation of Polarizing Plate A:

A stretched polyvinyl alcohol film was processed to adsorb iodine thereby to form a polarizing film. The commercial transparent film 1 was saponified, and stuck to both surfaces of the polarizing film, using a polyvinyl alcohol adhesive, thereby to form a polarizing plate A.

(2) Formation of Polarizing Plate B:

In the same manner as above, a polarizing film was formed, and the transparent film 1 was saponified and stuck to one surface of the polarizing film, using a polyvinyl alcohol adhesive. Also in the same manner as above, the transparent film 2 produced in the above was stuck to the other surface of the polarizing film, thereby forming a polarizing plate B.

(3) Formation of Polarizing Plate C:

In the same manner as above, a polarizing film was formed, and the transparent film 1 was saponified and stuck to one surface of the polarizing film, using a polyvinyl alcohol adhesive. Also in the same manner as above, the transparent film 3 produced in the above was stuck to the other surface of the polarizing film, thereby forming a polarizing plate C.

(4) Formation of Polarizing Plate D:

In the same manner as above, a polarizing film was formed, the transparent film 1 was saponified and stuck to one surface of the polarizing film, using a polyvinyl alcohol adhesive. Also in the same manner as above, the transparent film 7 produced in the above was stuck to the other surface of the polarizing film, thereby forming a polarizing plate D.

(5) Formation of Polarizing Plate E:

In the same manner as above, a polarizing film was formed, the transparent film 1 was saponified and stuck to one surface of the polarizing film, using a polyvinyl alcohol adhesive. Also in the same manner as above, the transparent film 8 produced in the above was stuck to the other surface of the polarizing film, thereby forming a polarizing plate E.

(6) Formation of Polarizing Plate F:

In the same manner as above, a polarizing film was formed, the transparent film 1 was saponified and stuck to one surface of the polarizing film, using a polyvinyl alcohol adhesive. Also in the same manner as above, the transparent film 4 produced in the above was stuck to the other surface of the polarizing film, thereby forming a polarizing plate E.

(7) Formation of Polarizing Plate G:

In the same manner as above, a polarizing film was formed, the transparent film 1 was saponified and stuck to one surface of the polarizing film, using a polyvinyl alcohol adhesive. Also in the same manner as above, the transparent film 6 produced in the above was stuck to the other surface of the polarizing film, thereby forming a polarizing plate G.

The configurations of the polarizing plates A to G are summarized in the following Table.

TABLE 2

| Polarizing Plate No. | Film stuck to outside surface | | | Film stuck to inside surface | | |
|---|---|---|---|---|---|---|
| | type | Re (nm) | Rth (nm) | type | Re (nm) | Rth (nm) |
| A | Transparent Film 1 | 1 | 38 | Transparent Film 1 | 1 | 38 |
| B | Transparent Film 1 | 1 | 38 | Transparent Film 2 | 0.3 | 3.2 |
| C | Transparent Film 1 | 1 | 38 | Transparent Film 3 | 2 | −2 |
| D | Transparent Film 1 | 1 | 38 | Transparent Film 7 | 55 | 200 |
| E | Transparent Film 1 | 1 | 38 | Transparent Film 8 | 60 | 250 |
| F | Transparent Film 1 | 1 | 38 | Transparent Film 4 | 287 | −8 |
| G | Transparent Film 1 | 1 | 38 | Transparent Film 6 | 125 | −70 |

12. Production of VA-Mode Liquid-Crystal Display Device

EXAMPLES 1 to 4, and COMPARATIVE EXAMPLE 1

Using an adhesive, the polarizing plates produced in the above were stuck to the VA-mode liquid-crystal cell produced in the above, according to the combination indicated in the following Table. These were stuck together in such a manner that the absorption axis of the polarizing plate closer to the color filter could be parallel to the absorption axis of the polarizing layer formed on the color filter and the transparent film 1 of the polarizing plate could face outside. Subsequently, the polarizing plate was stuck to the other side of the liquid-crystal cell in such a manner that the transparent film 1 thereof could face outside in a cross Nicol configuration, thereby constructing a VA-mode liquid-crystal display device.

<Production of IPS-Mode Liquid-Crystal Display Device>

COMPARATIVE EXAMPLE 2, and EXAMPLES 5 to 12

Using an adhesive, the polarizing plates produced in the above were stuck to the IPS-mode liquid-crystal cell produced in the above, according to the combination indicated in the following Table. These were stuck together in such a manner that the absorption axis of the polarizing plate closer to the color filter could be parallel to the absorption axis of the polarizing film formed on the color filter and the transparent film 1 of the polarizing plate could face outside. Subsequently, the polarizing plate was stuck to the other side of the liquid-crystal cell in such a manner that the transparent film 1 thereof could face outside in a cross Nicol configuration, thereby constructing an IPS-mode liquid-crystal display device.

Thus produced, the liquid-crystal display device was put on a backlight, and visually checked for the front contrast (CR) and the condition of oblique light leakage (polar angle 60°, azimuth angle 45°) in a dark room, and the evaluation results are shown in the following Table.

The optical characteristics of the layer positioned between the in-cell polarizing layer and the first polarizing element were measured with Axometrics' Axoscan in the process of assembling the polarizing layer, the film, the adhesive layer and the substrate.

TABLE 3

| | Configuration | | | | Optical Characteristics of layers disposed between in-cell polarizing layer and first polarizing element | | | | | | Evaluation Results | |
| | | | | | Re (nm) | | | Rth (nm) | | | | |
| | In-Cell Polarizing Layer | Cell | CF-side Polarizing Plate | Counter Polarizing Plate | CF Substrate | Adhesive Layer | Film | CF Substrate | Adhesive Layer | Film | Front CR | Oblique Light Leakage |
|---|---|---|---|---|---|---|---|---|---|---|---|---|
| Comparative Example 1 | Degree of Polarization 90.4% | VA-Mode Liquid-Crystal Cell | Polarizing Plate A | Polarizing Plate D | 0 | 0 | 1 | 1 | 0 | 38 | ◎ | X |
| Example 1 | | | Polarizing Plate B | Polarizing Plate D | 0 | 0 | 0.3 | 1 | 0 | 3.2 | ◎ | ○ |
| Example 2 | | | Polarizing Plate B | Polarizing Plate E | 0 | 0 | 0.3 | 1 | 0 | 3 | ◎ | ◎ |
| Example 3 | | | Polarizing Plate C | Polarizing Plate E | 0 | 0 | 2 | 1 | 0 | −2 | ◎ | ◎ |
| Example 4 | | | Polarizing Film directly stuck (adhesive layer, Re = 0, Rth = 0) | Polarizing Plate E | 0 | 0 | — | 1 | 0 | no | ◎ | ◎ |

TABLE 4

| | Configuration | | | | Optical Characteristics of layers disposed between in-cell polarizing layer and first polarizing element | | | | | | Evaluation Results | |
| | | | | | Re (nm) | | | Rth (nm) | | | | |
| | In-Cell Polarizing Layer | Cell | CF-side Polarizing Plate | Counter Polarizing Plate | CF Substrate | Adhesive Layer | Film | CF Substrate | Adhesive Layer | Film | Front CR | Oblique Light Leakage |
|---|---|---|---|---|---|---|---|---|---|---|---|---|
| Comparative Example 2 | Degree of Polarization 90.4% | IPS-Mode Liquid-Crystal Cell | Polarizing Plate A | Polarizing Plate A | 0 | 0 | 5 | 1 | 0 | 38 | ◎ | X |
| Example 5 | | | Polarizing Plate B | Polarizing Plate A | 0 | 0 | 0.3 | 1 | 0 | 3.2 | ◎ | ○ |
| Example 6 | | | Polarizing Plate B | Polarizing Plate B | 0 | 0 | 0.3 | 1 | 0 | 3.2 | ◎ | ○ |
| Example 7 | | | Polarizing Plate C | Polarizing Plate A | 0 | 0 | 2 | 1 | 0 | −2 | ◎ | ○ |
| Example 8 | | | Polarizing Plate C | Polarizing Plate C | 0 | 0 | 2 | 1 | 0 | −2 | ◎ | ○ |
| Example 9 | | | Polarizing Plate B | Polarizing Plate F | 0 | 0 | 0.3 | 1 | 0 | 3.2 | ◎ | ◎ |
| Example 10 | | | Polarizing Plate B | Polarizing Plate G | 0 | 0 | 0.3 | 1 | 0 | 3.2 | ◎ | ◎ |
| Example 11 | | | Polarizing Plate C | Polarizing Plate F | 0 | 0 | 2 | 1 | 0 | −2 | ◎ | ◎ |
| Example 12 | | | Polarizing Plate C | Polarizing Plate G | 0 | 0 | 2 | 1 | 0 | −2 | ◎ | ◎ |
| Comparative Example 3 | no | | Polarizing Plate B | Polarizing Plate B | 0 | 0 | 0.3 | 1 | 0 | 3.2 | X | ○ |

DESCRIPTION OF REFERENCE NUMERALS

1a First Cell Substrate
1b Second Cell Substrate
2 Liquid-Crystal Layer
3 In-Cell Polarizing Layer
5 Color Filter Layer
10a First Polarizing Element
10b Second Polarizing Element
11a Absorption Axis of First Polarizing Element
11b Absorption Axis of Second Polarizing Element
12 Liquid-Crystal Cell
14a First Optical Film
14b Second Optical Film

The invention claimed is:

1. A liquid-crystal display device comprising first and second polarizing elements, and a liquid-crystal cell disposed between the first and second polarizing elements, wherein:
the liquid-crystal cell comprises first and second substrates (provided that the first substrate is disposed closer to the first polarizing element, and the second substrate is disposed closer to the second polarizing element), a liquid-crystal layer disposed between the first and second substrates, a color filter layer disposed on an inner surface of the first substrate, and an in-cell polarizing layer comprising at least a dichroic dye disposed between the color filter layer and the liquid-crystal layer,
the absorption axis of the first polarizing element and the absorption axis of the in-cell polarizing layer are parallel to each other, and the sum total of the absolute values of retardation in-plane, Re, of all the layers disposed between the in-cell polarizing layer and the first polarizing element is equal to or less than 10 nm, and the sum total of the absolute values of retardation along the thickness-direction, Rth, of said all of the layers thereof is equal to or less than 15 nm.

2. The liquid-crystal display device according to claim 1, wherein the in-cell polarizing layer is a layer of a liquid-crystal composition comprising at least a dichroic dye.

3. The liquid-crystal display device according to claim 2, wherein the dichroic dye is a liquid-crystal compound having an order parameter of equal to or more than 0.85.

4. The liquid-crystal display device according to claim 1, wherein the thickness of the in-cell polarizing layer is from 0.02 to 0.50 μm, and the degree of polarization thereof is from 70 to 99%.

5. The liquid-crystal display device according to claim 1, wherein the in-cell polarizing layer is a layer of a composition comprising at least one azo dye represented by formula (I):

[Formula 1]

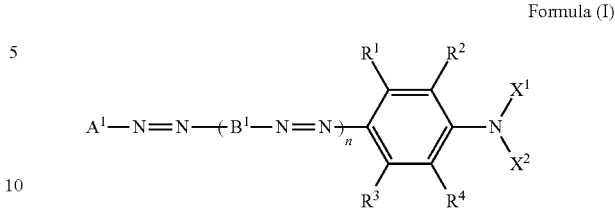

Formula (I)

wherein $R^1$, $R^2$, $R^3$, $R^4$, $X^1$ and $X^2$ each independently represent a hydrogen atom or a substituent; $A^1$ represents a phenyl, naphthyl or aromatic heterocyclic group optionally having a substituent; $B^1$ represents a divalent aromatic hydrocarbon or divalent aromatic heterocyclic group optionally having a substituent; n indicates an integer of from 1 to 5; provided that at least one $B^1$ is a phenylene group having an alkyl group.

6. The liquid-crystal display device according to claim 5, wherein in formula (I), $A^1$ is a phenyl group optionally having a substituent, $B^1$ is a divalent phenylene group optionally having a substituent, and n is an integer of from 2 to 4.

7. The liquid-crystal display device according to claim 5, wherein the azo dye represented by formula (I) is represented by formula (II):

[Formula 2]

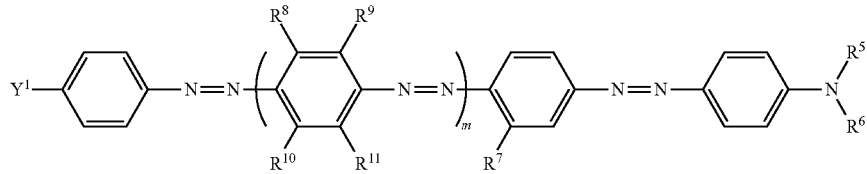

Formula (II)

wherein $R^5$, $R^6$ and $R^7$ each independently represent an alkyl group; $R^8$, $R^9$, $R^{10}$ and $R^{11}$ each independently represent a hydrogen atom or a substituent; $Y^1$ represents an alkyl, alkenyl, alkynyl, aryl, alkoxy, alkoxycarbonyl, acyloxy, acylamino, alkoxycarbonylamino, sulfonylamino, sulfamoyl, carbamoyl, alkylthio, sulfonyl or ureido group optionally having a substituent; and m indicates an integer of from 1 to 3.

8. The liquid-crystal display device according to claim 1, comprising, between the liquid-crystal cell and the first polarizing element, a first optical film of which the absolute value of retardation in-plane, Re, is equal to or less than 10 nm and the absolute value of retardation along the thickness-direction, Rth, is equal to or less than 15 nm.

9. The liquid-crystal display device according to claim 8, wherein the first optical film is a cellulose acylate film.

10. The liquid-crystal display device according to claim 8, wherein the first optical film is an acrylic film.

11. The liquid-crystal display device according to claim 1, in which the liquid-crystal cell is a vertical alignment-mode liquid-crystal cell, and which comprises, between the liquid-crystal cell and the second polarizing element, a second optical film having retardation in-plane, Re, of from 40 to 80 nm and retardation along the thickness-direction, Rth, of from 180 to 250 nm.

12. The liquid-crystal display device according to claim 1, in which the liquid-crystal cell is a horizontal alignment-mode liquid-crystal cell, and which comprises, between the liquid-crystal cell and the second polarizing element, a second optical film, having retardation in-plane, Re, of from 180 to 300 nm and retardation along the thickness, Rth, of from −30 to 30 nm, or having retardation in-plane, Re, of from 80 to 160 nm and retardation along the thickness, Rth, of from −50 to −110 nm.

* * * * *